CODED MESSAGE GENERATOR

Filed Dec. 5, 1966 15 Sheets-Sheet 1

INVENTORS
JOHN GUZAK, JR.
BUSTER J. RUSSELL
WILLIAM B. MILES

Strauch, Nolan, Neale, Nies & Kurz
ATTORNEYS

Jan. 20, 1970 J. GUZAK, JR., ET AL 3,491,337

CODED MESSAGE GENERATOR

Filed Dec. 5, 1966 15 Sheets-Sheet 2

| | | | |
|---|---|---|---|
| 2A | 2C | 2E | 2F |
| 2B | 2D | 2G | 2H |

INVENTORS
JOHN GUZAK, JR.
BUSTER J. RUSSELL
WILLIAM B. MILES

BY Strauch, Nolan, Neale, Nies & Kurz
ATTORNEYS

Jan. 20, 1970 J. GUZAK, JR., ET AL 3,491,337
CODED MESSAGE GENERATOR
Filed Dec. 5, 1966 15 Sheets-Sheet 3

| | | | |
|---|---|---|---|
| 2A | 2C | 2E | 2F |
| 2B | 2D | 2G | 2H |

INVENTORS
JOHN GUZAK, JR.
BUSTER J. RUSSELL
WILLIAM B. MILES
BY Strauch, Nolan, Neale, Nies & Kurz
ATTORNEYS

INVENTORS
JOHN GUZAK, JR.
BUSTER J. RUSSELL
WILLIAM B. MILES

BY Strauch, Nolan, Neale, Nies & Kurz
ATTORNEYS

Jan. 20, 1970 J. GUZAK, JR., ET AL 3,491,337

CODED MESSAGE GENERATOR

Filed Dec. 5, 1966 15 Sheets-Sheet 5

| | | | |
|---|---|---|---|
| 2A | 2C | 2E | 2F |
| 2B | 2D | 2G | 2H |

INVENTORS
*JOHN GUZAK, JR.*
*BUSTER J. RUSSELL*
*WILLIAM B. MILES*

BY *Strauch, Nolan, Neale, Nies & Kurz*
ATTORNEYS

| | | | |
|---|---|---|---|
| 2A | 2C | 2E | 2F |
| 2B | 2D | 2G | 2H |

INVENTORS
JOHN GUZAK, JR.
BUSTER J. RUSSELL
WILLIAM B. MILES

BY Strauch, Nolan, Neale, Nies & Kurz
ATTORNEYS

| | | | |
|---|---|---|---|
| 2A | 2C | 2E | 2F |
| 2B | 2D | 2G | 2H |

INVENTORS
JOHN GUZAK, JR.
BUSTER J. RUSSELL
WILLIAM B. MILES
BY Strauch, Nolan, Neale, Nies & Kurz
ATTORNEYS Jan. 20, 1970 J. GUZAK, JR., ET AL 3,491,337

CODED MESSAGE GENERATOR

Filed Dec. 5, 1966 15 Sheets-Sheet 8

| | | | |
|---|---|---|---|
| 2A | 2C | 2E | 2F |
| 2B | 2D | 2G | 2H |

INVENTORS
JOHN GUZAK, JR.
BUSTER J. RUSSELL
WILLIAM B. MILES

BY Strauch, Nolan, Neale, Nies & Kurz
ATTORNEYS

| | | | |
|---|---|---|---|
| 2A | 2C | 2E | 2F |
| 2B | 2D | 2G | 2H |

INVENTORS
JOHN GUZAK, JR.
BUSTER J. RUSSELL
WILLIAM B. MILES
BY Strauch, Nolan, Neale, Nies & Kurz
ATTORNEYS

INVENTORS
JOHN GUZAK, JR.
BUSTER J. RUSSELL
WILLIAM B. MILES

BY Strauch, Nolan, Neale, Nies & Kurz
ATTORNEYS

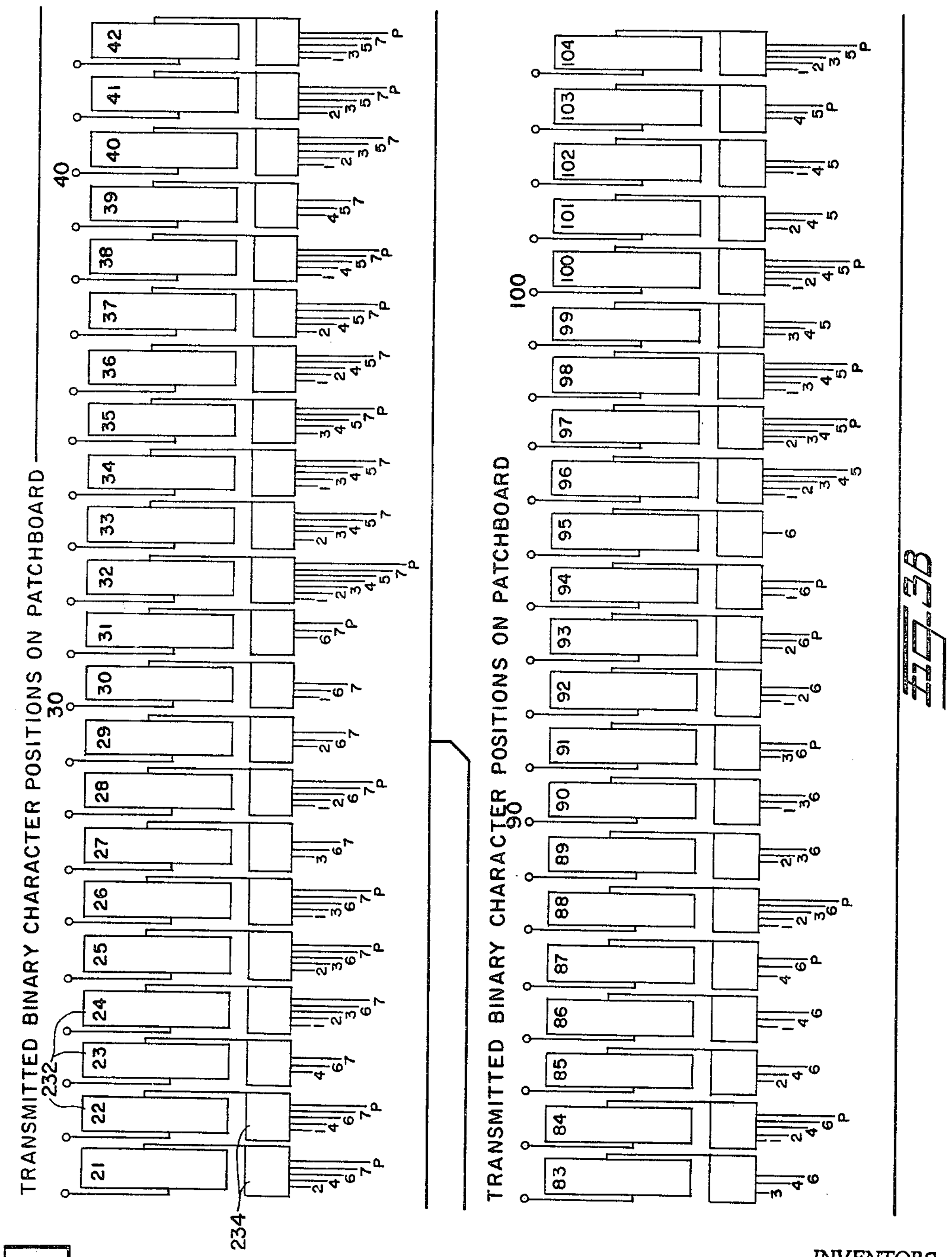
FIG. 3B
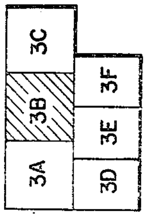
INVENTORS
JOHN GUZAK, JR.
BUSTER J. RUSSELL
WILLIAM B. MILES
BY Strauch, Nolan, Neale, Nies & Kurz
ATTORNEYS

INVENTORS.
JOHN GUZAK, JR.
BUSTER J. RUSSELL
WILLIAM B. MILES

BY Strauch, Nolan, Neale, Nies & Kurz
ATTORNEYS

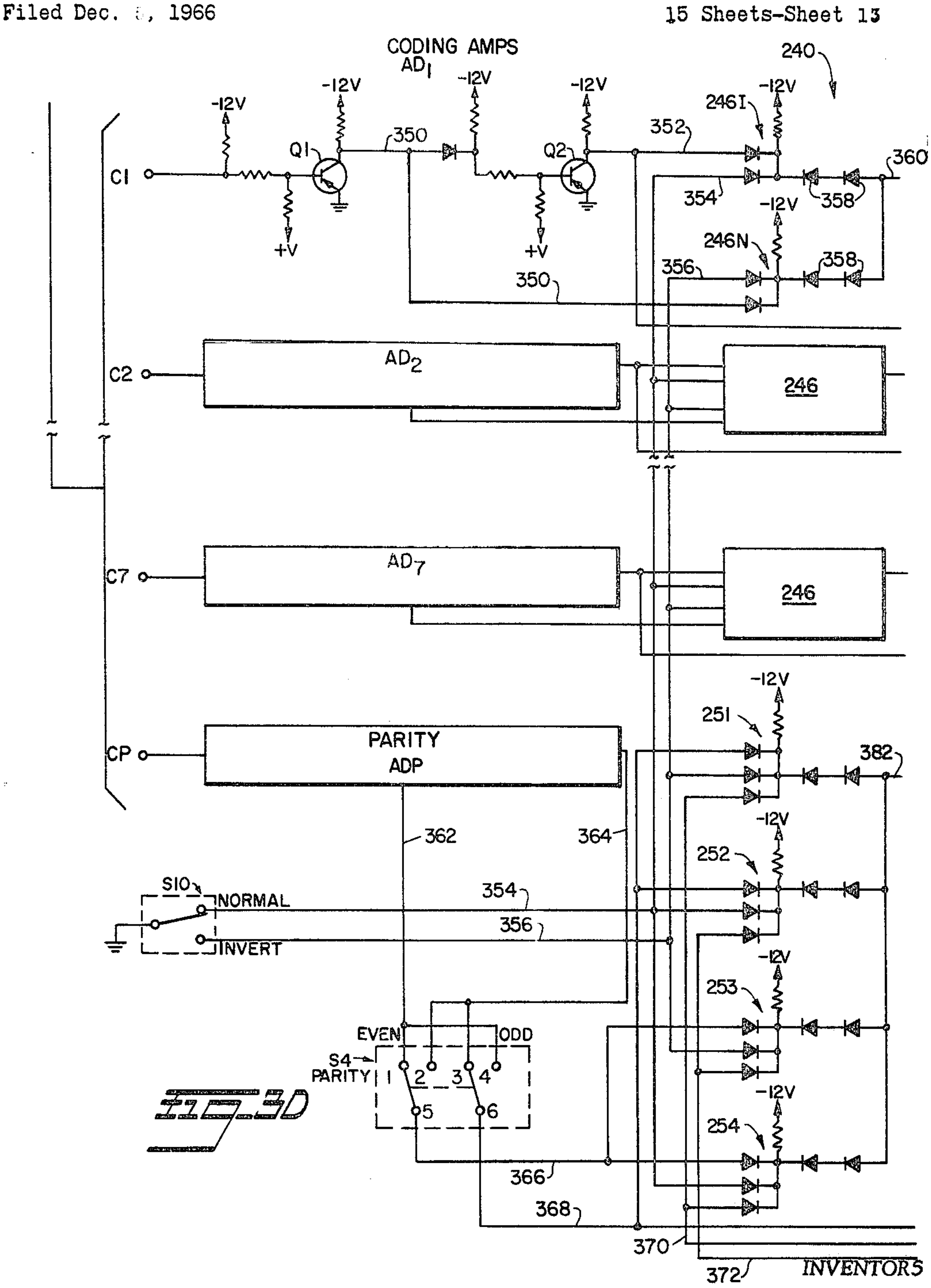
FIG. 3D
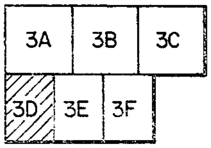
INVENTORS
JOHN GUZAK, JR.
BUSTER J. RUSSELL
WILLIAM B. MILES
BY Strauch, Nolan, Neale, Nies & Kurz
ATTORNEYS

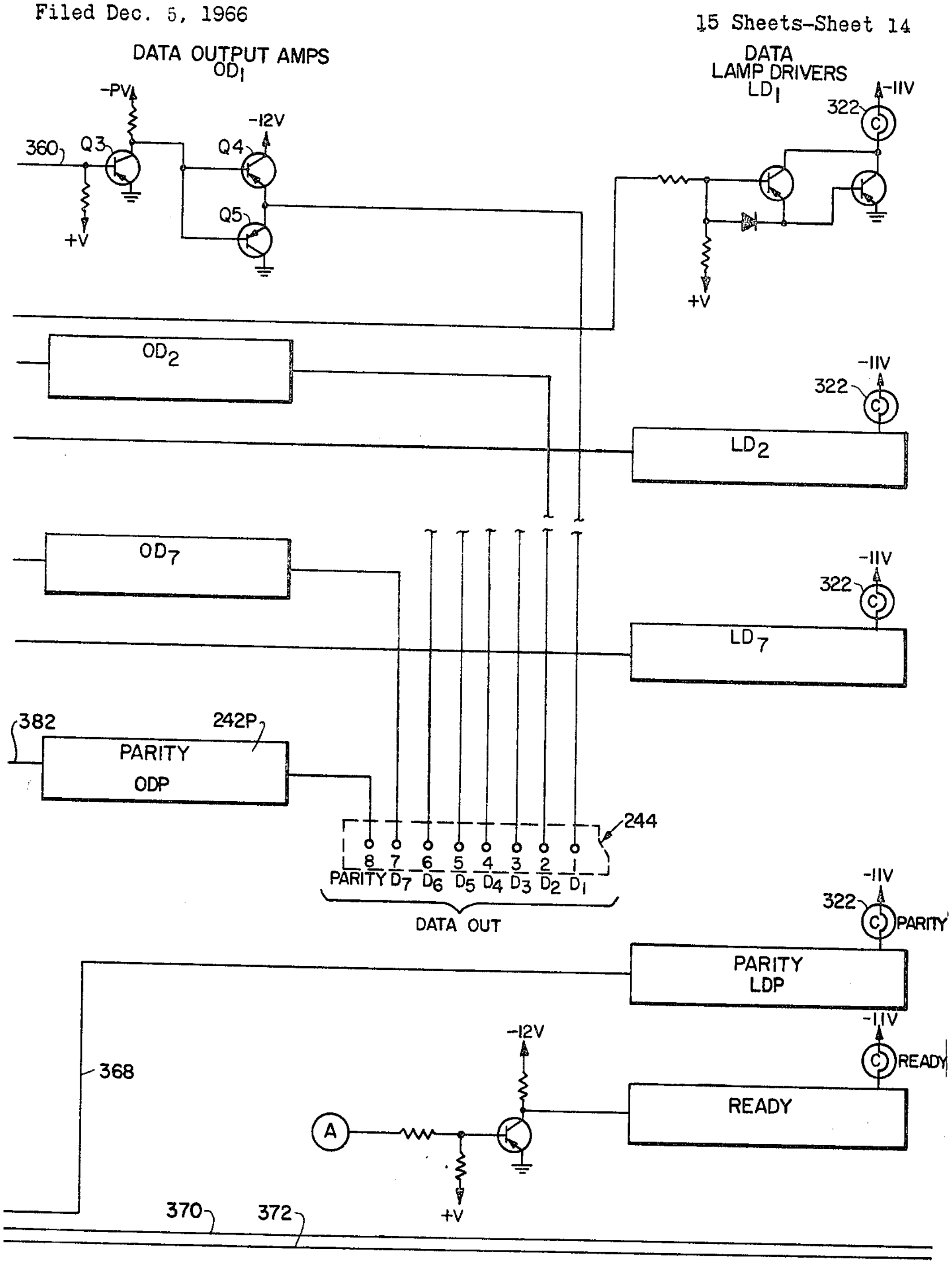
FIG. 3E
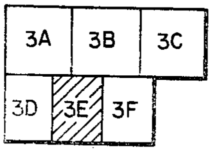
INVENTORS
JOHN GUZAK, JR.
BUSTER J. RUSSELL
WILLIAM B. MILES
BY Strauch, Nolan, Neale, Nies & Kurz
ATTORNEYS

INVENTORS
JOHN GUZAK, JR.
BUSTER J. RUSSELL
WILLIAM B. MILES

BY Strauch, Nolan, Neale, Nies & Kurz
ATTORNEYS

United States Patent Office 3,491,337
Patented Jan. 20, 1970

3,491,337
CODED MESSAGE GENERATOR

John Guzak, Jr., Waukegan, Buster J. Russell, Des Plaines, and William B. Miles, Arlington Heights, Ill., assignors to SCM Corporation, New York, N.Y., a corporation of New York Filed Dec. 5, 1966, Ser. No. 599,177
Int. Cl. G08b *29/00;* G06f *11/00*
U.S. Cl. 340—146.1 44 Claims

ABSTRACT OF THE DISCLOSURE

A test message generator with electronic controls, counter, sequencer, a plurality of preset binary code signal units connected to parallel code data outputs and a patching arrangement enabling selective sequencing of code signal transmission from any combination of the code signal units. Circuitry is provided enabling test generation of odd/even parity check bits, normal and inverted code signal pulses, insertion of parity errors, repetition of any selected code signal, and selective use of several modes of control of the counter-sequencer, including manual stepping, external demand of time base controlled stepping and several internal time bases for controlled stepping.

BACKGROUND

Figure 1:
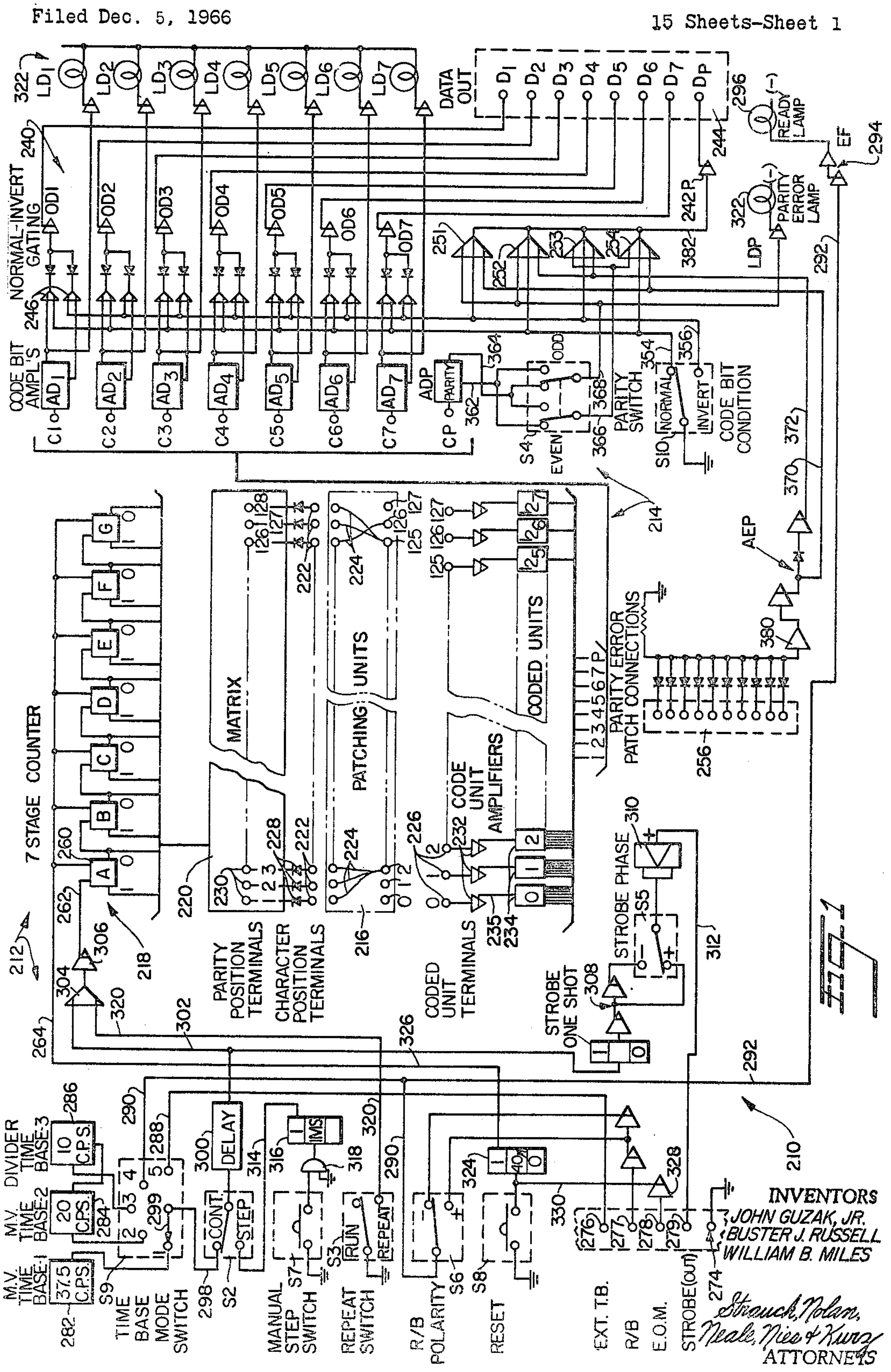

This invention relates to coded data communication systems transmitting apparatus and more particularly, is directly related to a coded message generator unit providing a source of binary code data made available on eight parallel data output lines, the unit being primarily intended for use as a test message generator.

Code message generators for testing and other purposes, which are primarily electro-mechanical relay, stepping switch and cam switch or tape controlled types of message generators, have been used for many years in production facilities for telegraphic equipment and also by the users of such equipment. Several electronic test message generators have been developed in recent years but the test message output of such electronic generators is either fixed or the variation in forms of control and output patterns is limited. One use of message generators is to make certain that line and receiving equipment are properly handling the bits of information in each code signal combination. Test message generators are also often used to determine alignment in printers as well as equipment capability for receiving all of the variations of electrical pulse arrangements in code signal groups within tolerated time in tervals. Test message generators can also be utilized to check operation of error checking and correction circuits in receiving equipment and such test message generators can be utilized locally or on a distant line circuit.

Some prior art examples of test message generators are found in Patent Nos. 2,303,054; 2,328,999; 2,832,071; 2,886,797; and 2,997,540.

While such message generators, in the past, were utilized almost solely by manufacturers of by large utility organizations, today, with data communication equipment being utilized by many business and other organizations with computer installations, the need for test message generators has been considerably diversified and expanded. The present invention was developed to provide a small compact non-mechanical test message generator having provision for generation of a sufficient number of different binary code bit combinations together with versatility in message variation and signal bit conditions to enable users of diversified data communication equipment to test their receiving equipment, e.g., read-out devices, before assigning the computors or other recording equipment to high cost work programs.

A code signal used in data communication systems to which this invention pertains consists of a group of bits of binary form and such code signals can be used to represent letters, numbers and functions as well as other symbols. If parity checking of each code signal is being accomplished, one of the binary bit locations in each code signal is used for parity check information. The bits in the code signal consist of either one of two level characteristics resulting from a pulse type combination signal of a fixed time duration. The two characteristics can be current and no-current, two different tone frequencies, two levels of current or voltage, etc. Parity is achieved by using the proper pulse level at the parity bit position to provide that a count of all bits occuring at one of the two characteristic levels in each code group be either odd or even. All signals must have even parity or all must have odd parity, and if a code signal shows a departure from the selected odd or even parity it is an erroneous signal. Special apparatus in some data communication equipment is used to provide parity checks of all code signals in a message. It is therefore desirable to include, within a test message generator, the capability of testing parity checking apparatus in data communication receiving equipment.

SUMMARY

Accordingly, a primary object of this invention resides in the provision of a novel code message generator having control versatility enabling maximum variations in code signal sequencing within a message and multiple variations in timing of successive code signal transmissions. In conjunction with this object a further object resides in providing components within the code message generator enabling generation of odd/even parity bits along with the generated code signal and further providing for introduction of parity errors into the generated code signal.

A further major object of this invention resides in the provision of an improved code message generator having a large number of code signal generating units, each preset to generate and transmit a different code combination signal, together with controls, a counting and code unit sequencing device, and connections from the sequencing device to the code units enabling any desired sequence and group arrangement of individual ones of the available code signals to be generated and transmitted to data communication equipment. The equipment envisaged by this object is desirable for use as a test message generator although it may be used as a fixed message generator in regular transmission equipment. In conjunction with the foregoing object, a still further object resides in constructing the major sections such as code signal generating units and counting and sequencing device and the major portion of the controls from electronic components.

In conjunction with the coded message generator as described in the immediately preceding objects, further objects reside in the provision within such a code message generator of:

(1) Components and circuits which enable testing of parity check equipment using either odd or even parity or first one and then the other.

(2) Components and circuits enabling selection of connections within the test generator whereby parity error can be introduced into any selected ones of the generated code signals to test the operation of parity checking equipment in or combined with the receiving apparatus being tested.

(3) control components and circuits including provision for utilizing any of plural sources of timed signal pulses, both internal and external as well as ready/busy signals from equipment being tested, and manually actuated stepping signal pulses, for stepping and counting and sequencing device.

(4) A control circuit enabling rapid convenient change from stepped sequencing to a continually repeated signal condition at a desired count position of the counting and sequencing device.

(5) Components and circuitry enabling rapid convenient change from the normal level code bit conditions within the generated code signal to an inverted code bit condition. In further conjunction with this circuitry additional circuits are provided to automatically enable the selected even or odd parity condition to exist and to accommodate any inserted parity errors whether the code bit condition circuitry is set for normal or inverted condition.

(6) Circuitry and components enabling visual observation of (a) code bit conditions within a code signal being generated, (b) generation of a parity error, and (c) indication that a ready condition exists in equipment being tested, such observations being utilized primarily during manual and repeat control of the message generator.

A further object resides in providing a novel test message generator with electronic controls, counter, sequencer, a plurality of preset binary code signal generating units connected to parallel code data outputs and a connection patching arrangement enabling selective sequencing of code signal transmission from any combination of the code signal units including circuitry enabling generation and transmission of odd/even parity check bits within the code signal, inverted coded signals, insertion of parity errors into the transmitted signal, repetition of any selected code signal, and selective use of several modes of control to the sequencer, including manual, external demand or time base and several internal time bases.

Further novel features and other objects of this invention will become apparent from the following detailed description, discussion and appended claims taken in conjunction with the accompanying drawings showing a preferred structure and embodiment, in which:

BRIEF DRAWING DESCRIPTION

Figure 2A:
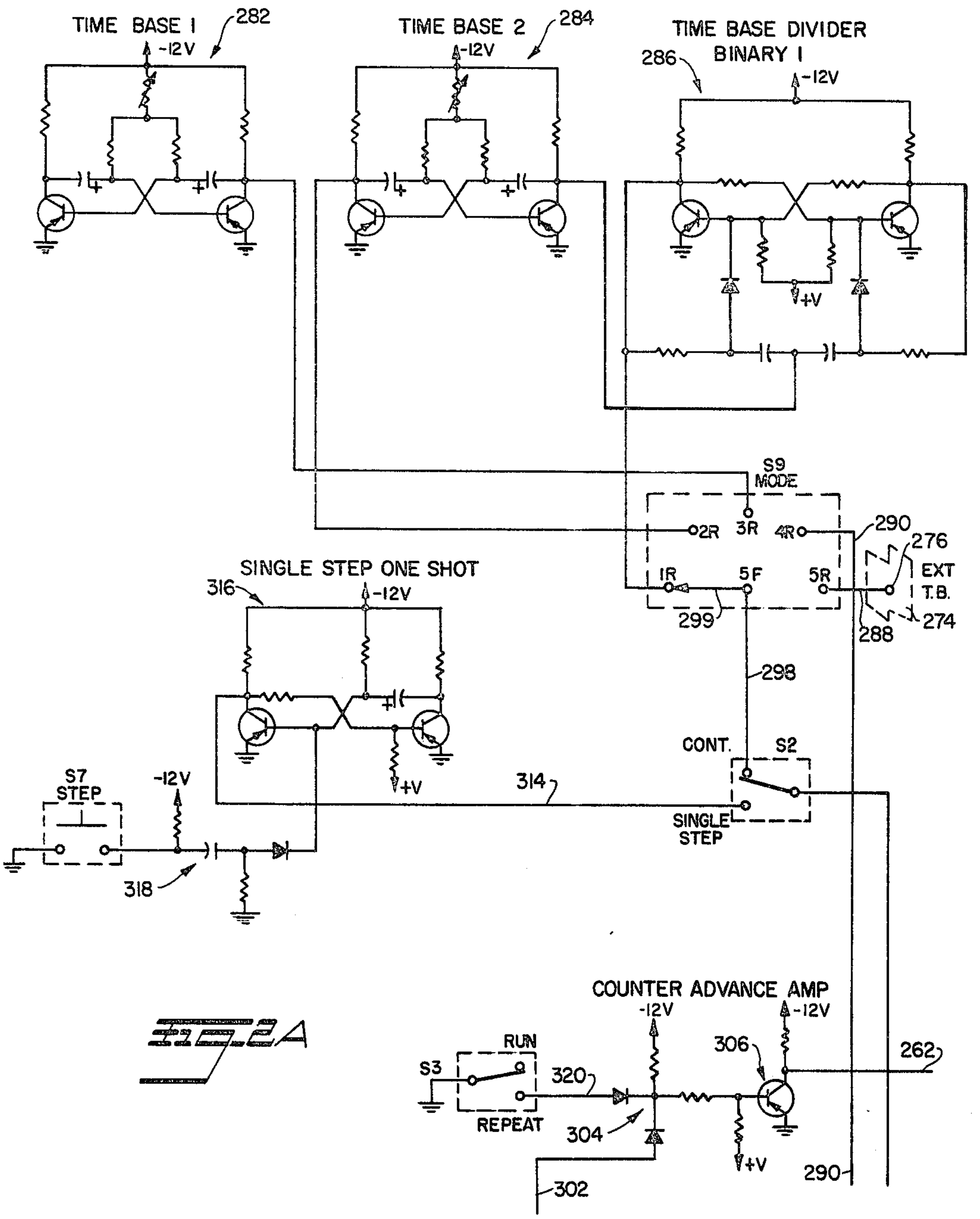
Figure 2B:
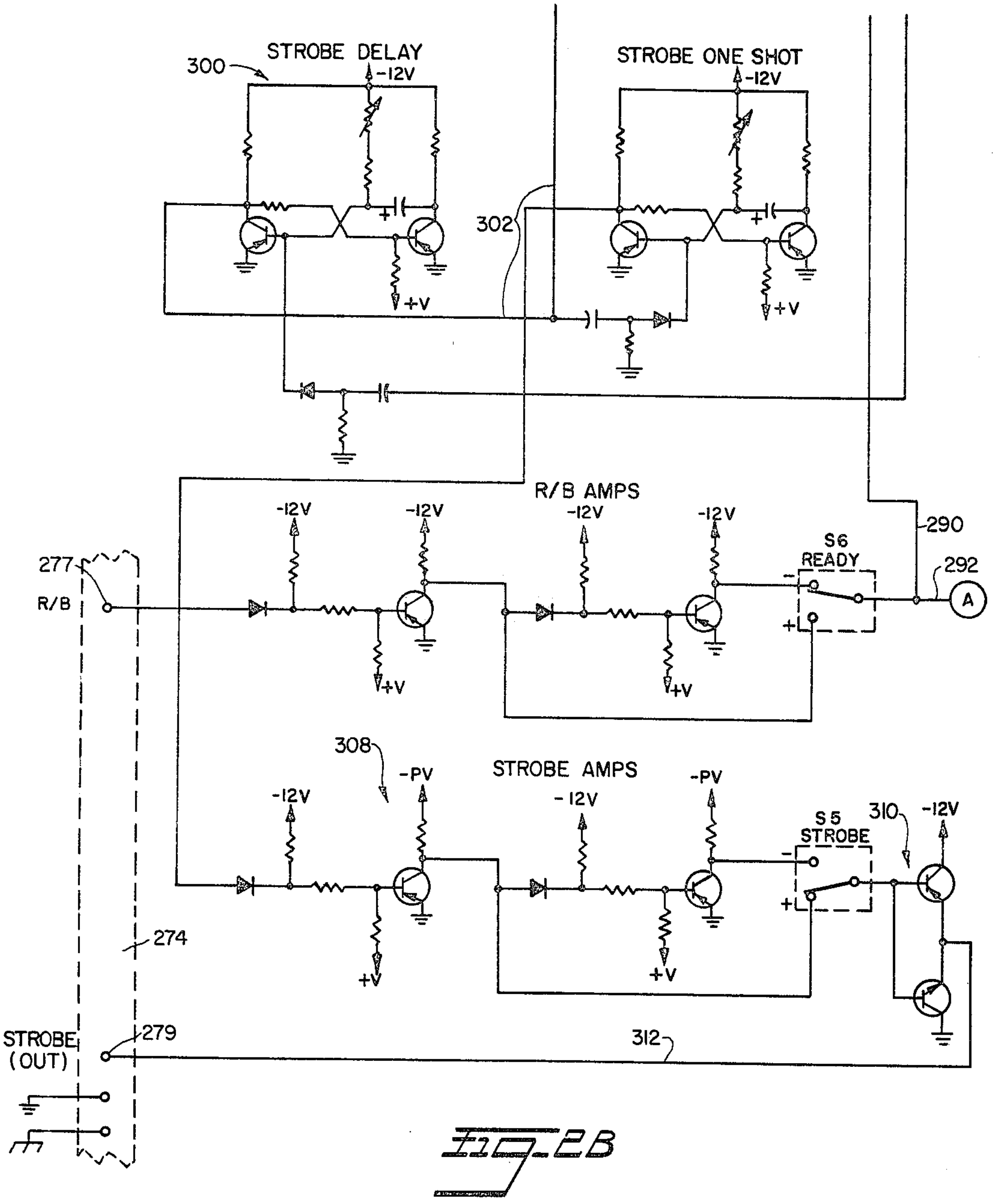
Figure 2C:
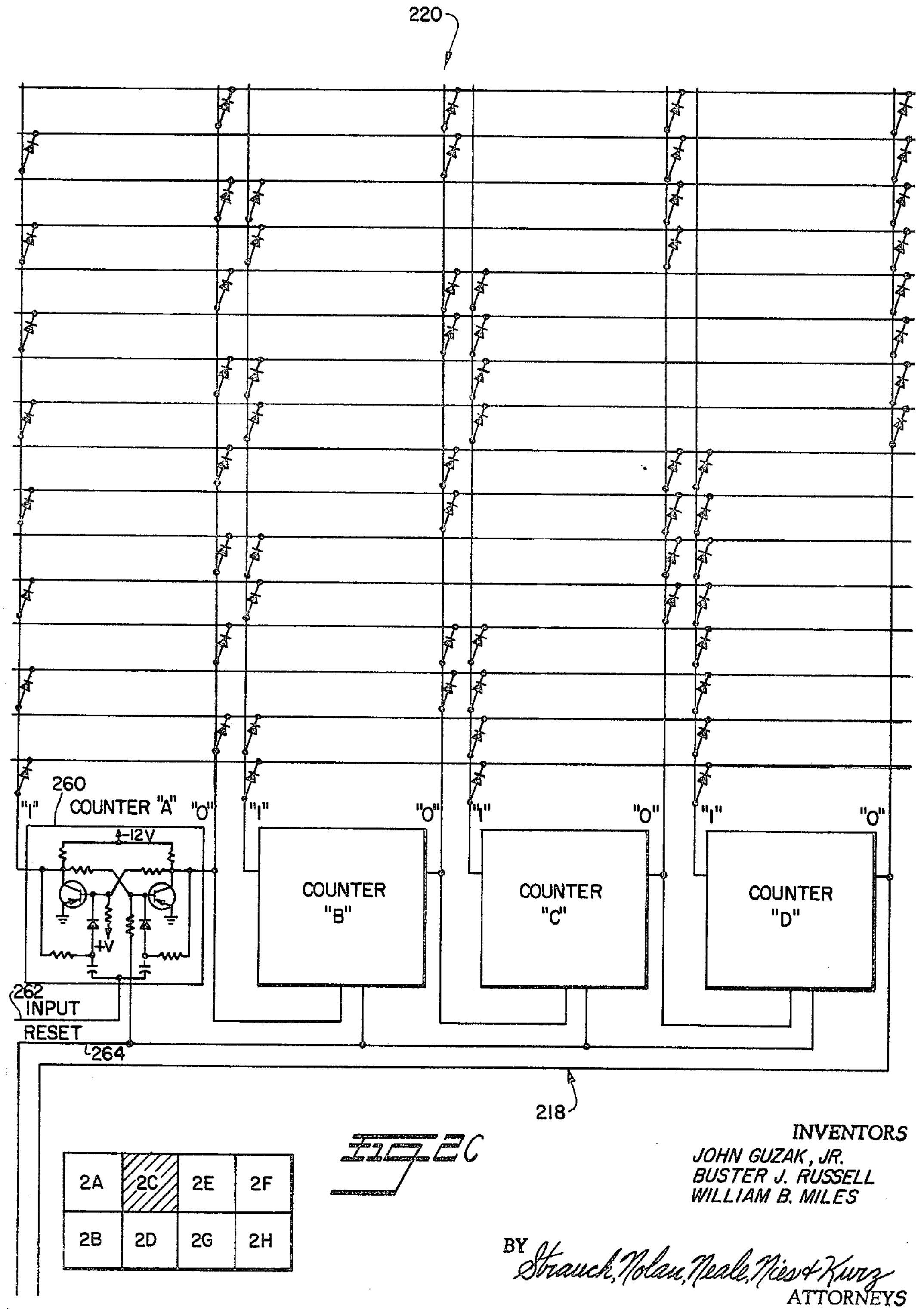
Figure 2D:
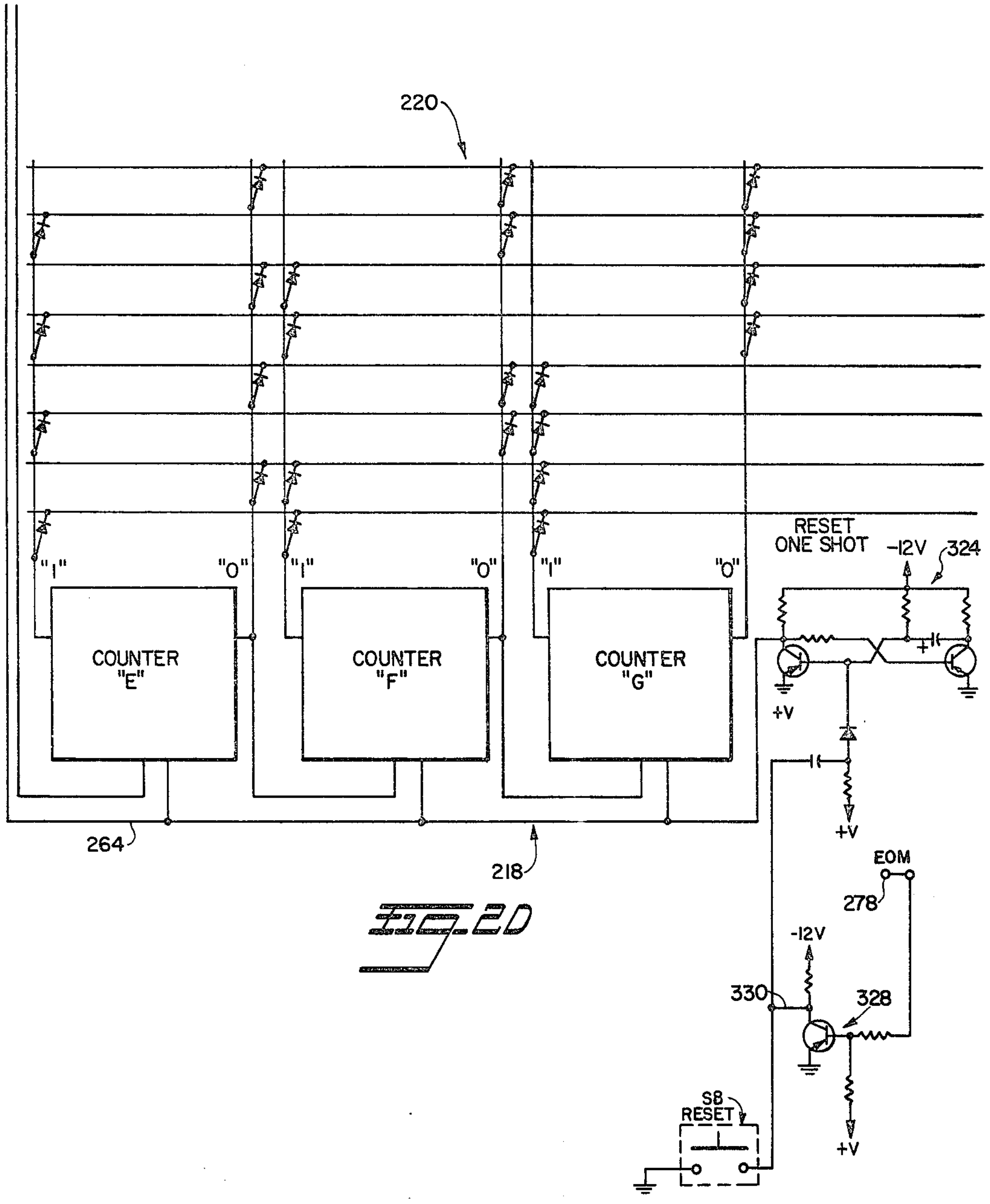
Figure 2E:
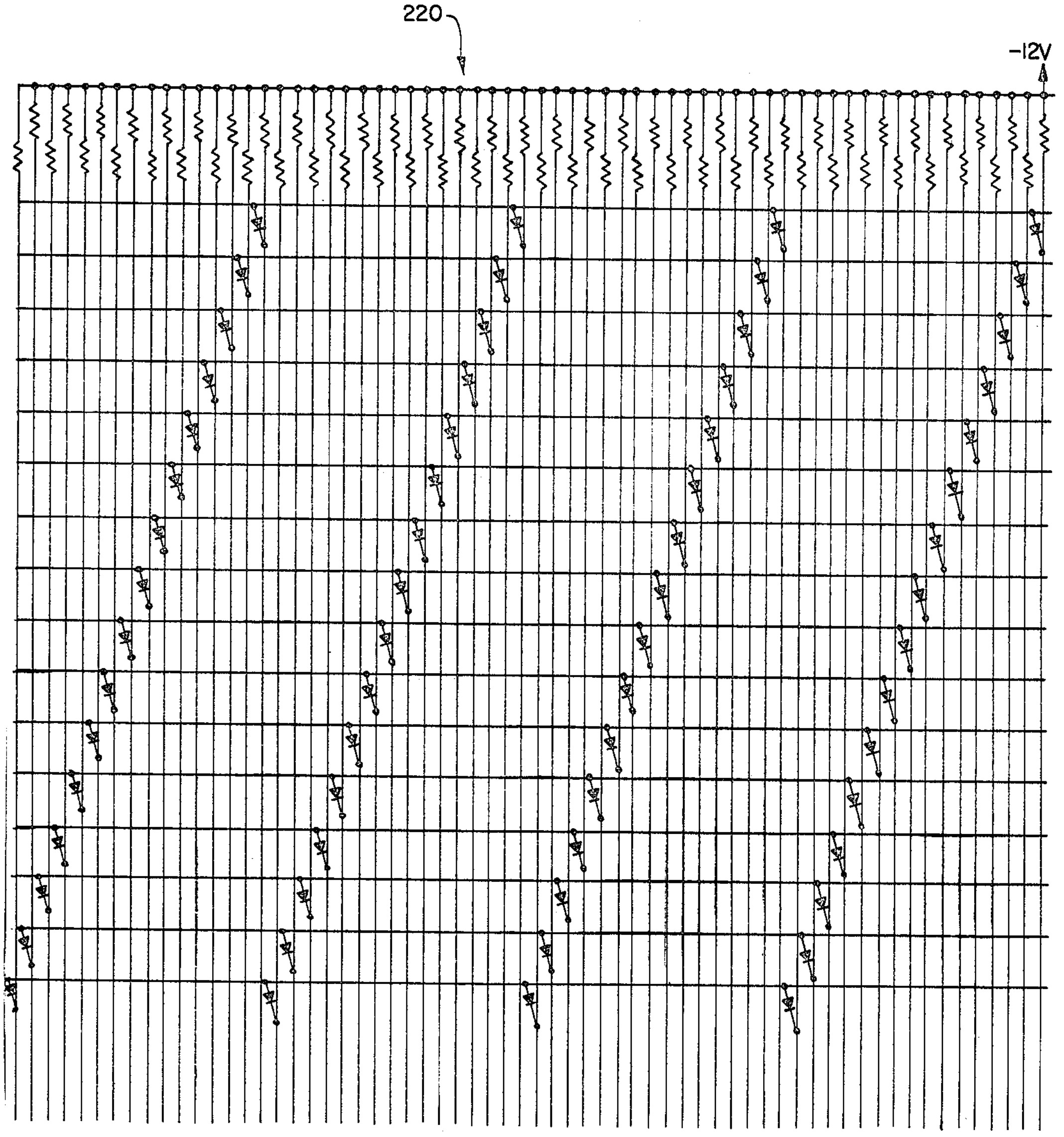
Figure 2F:
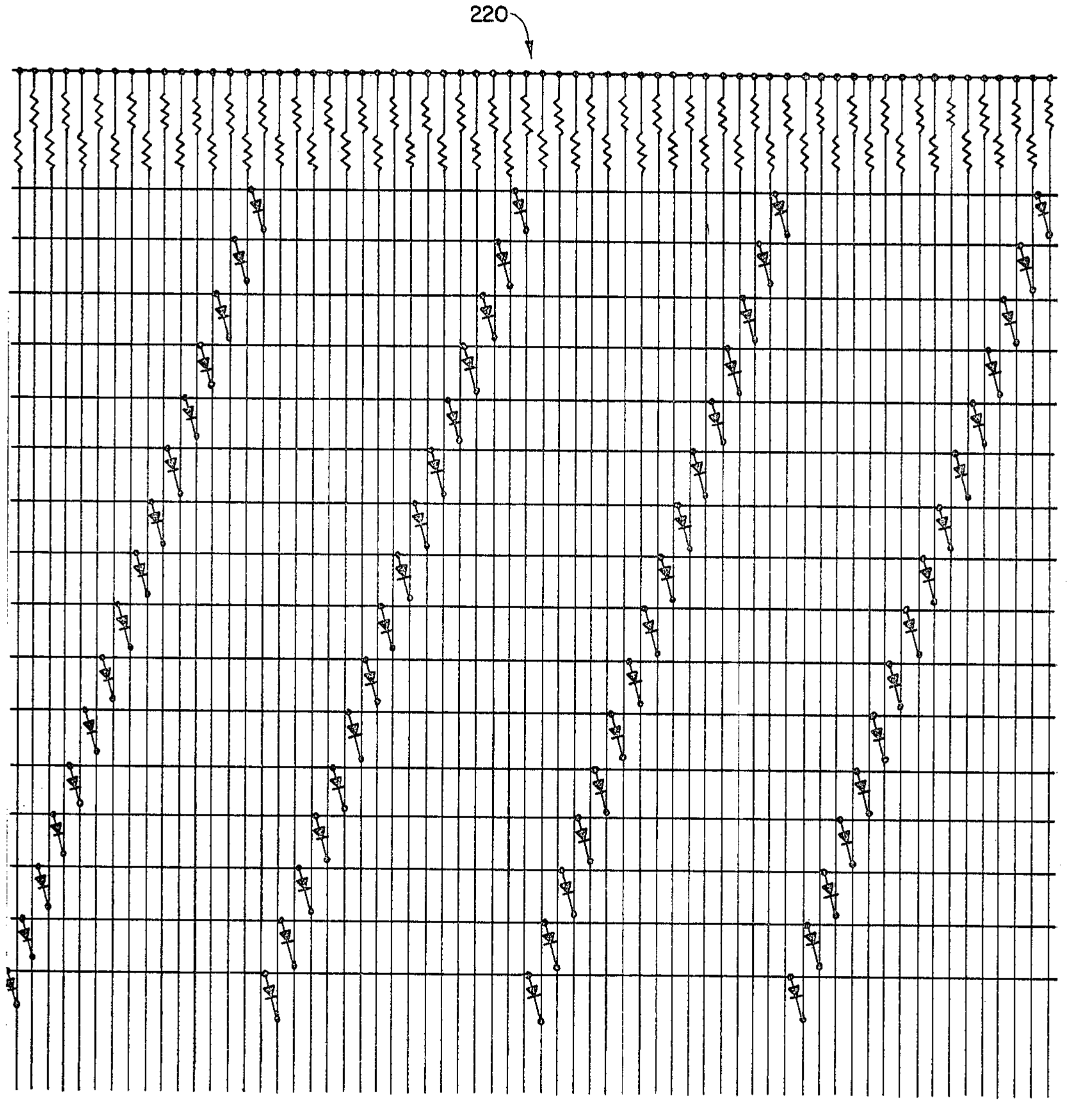
Figure 2G:
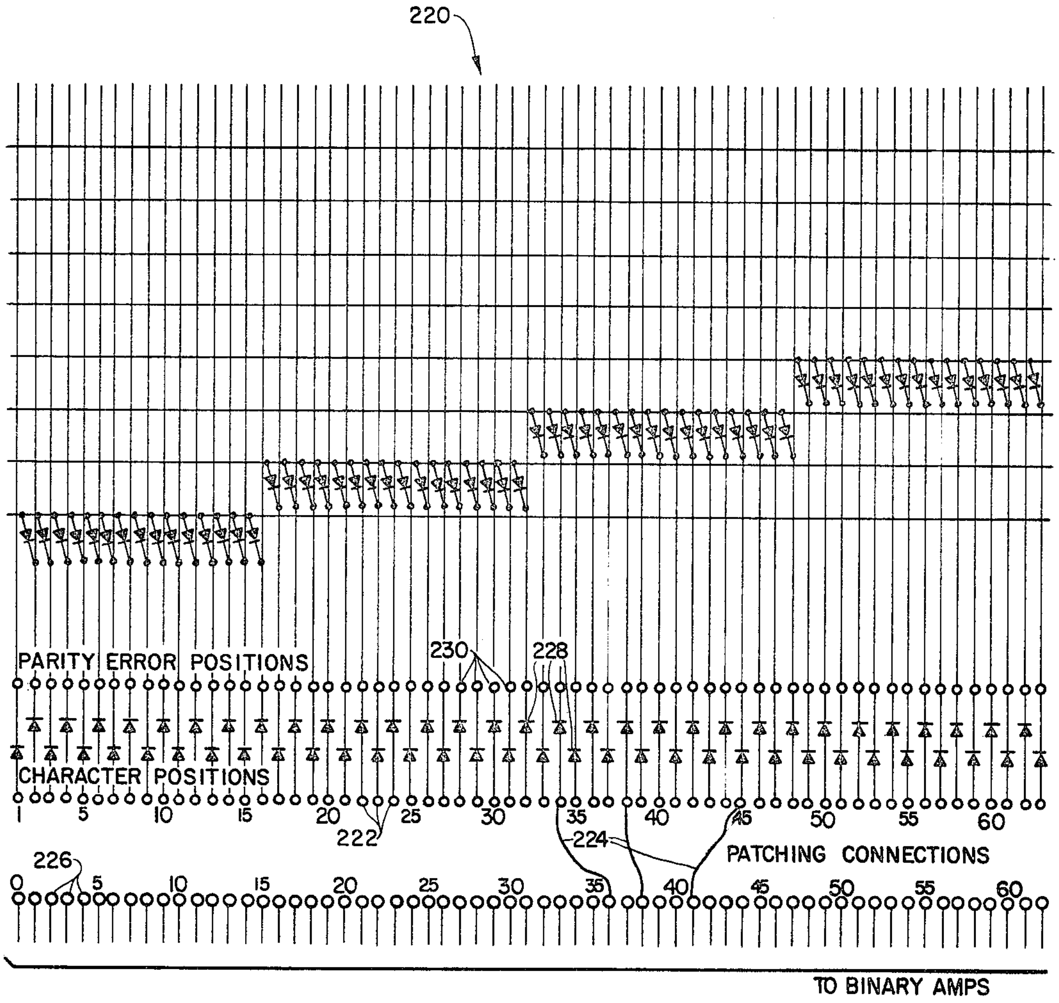
Figure 2H:
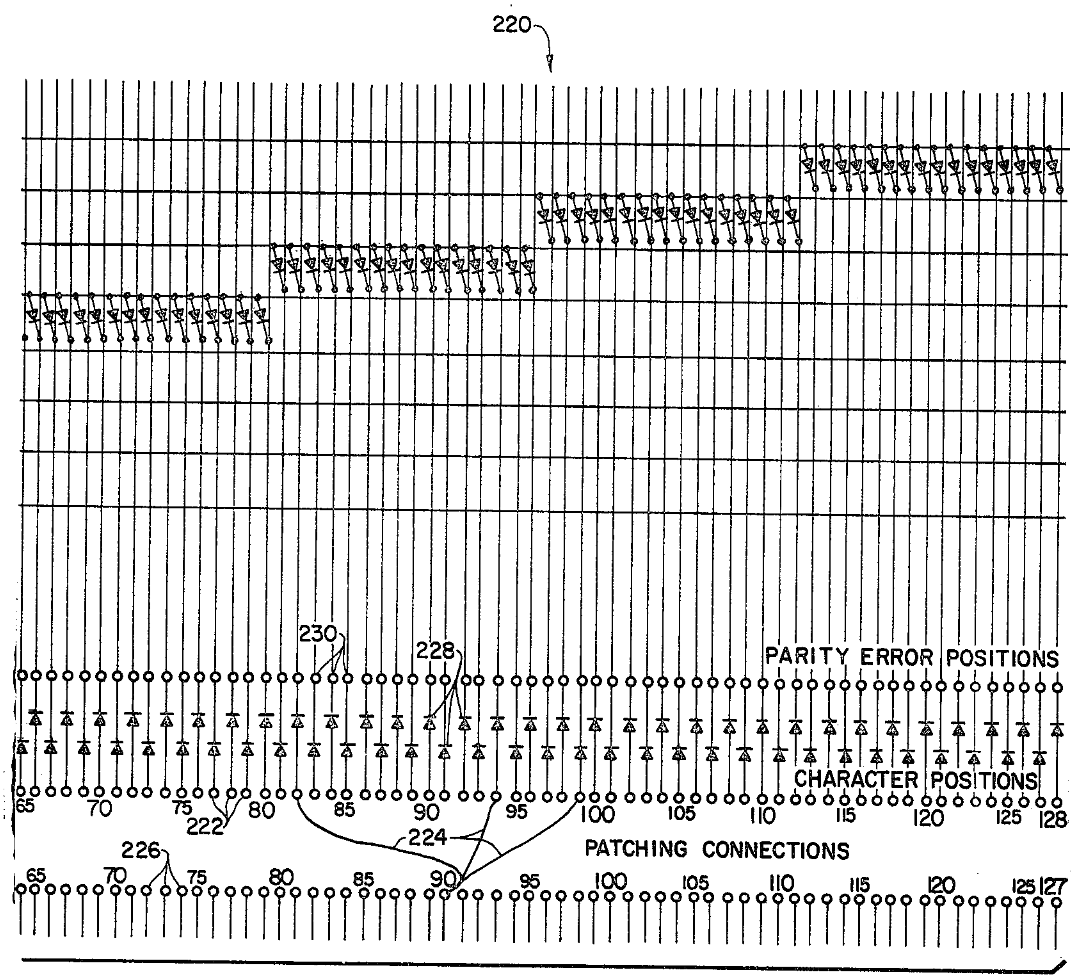
Figure 3A:
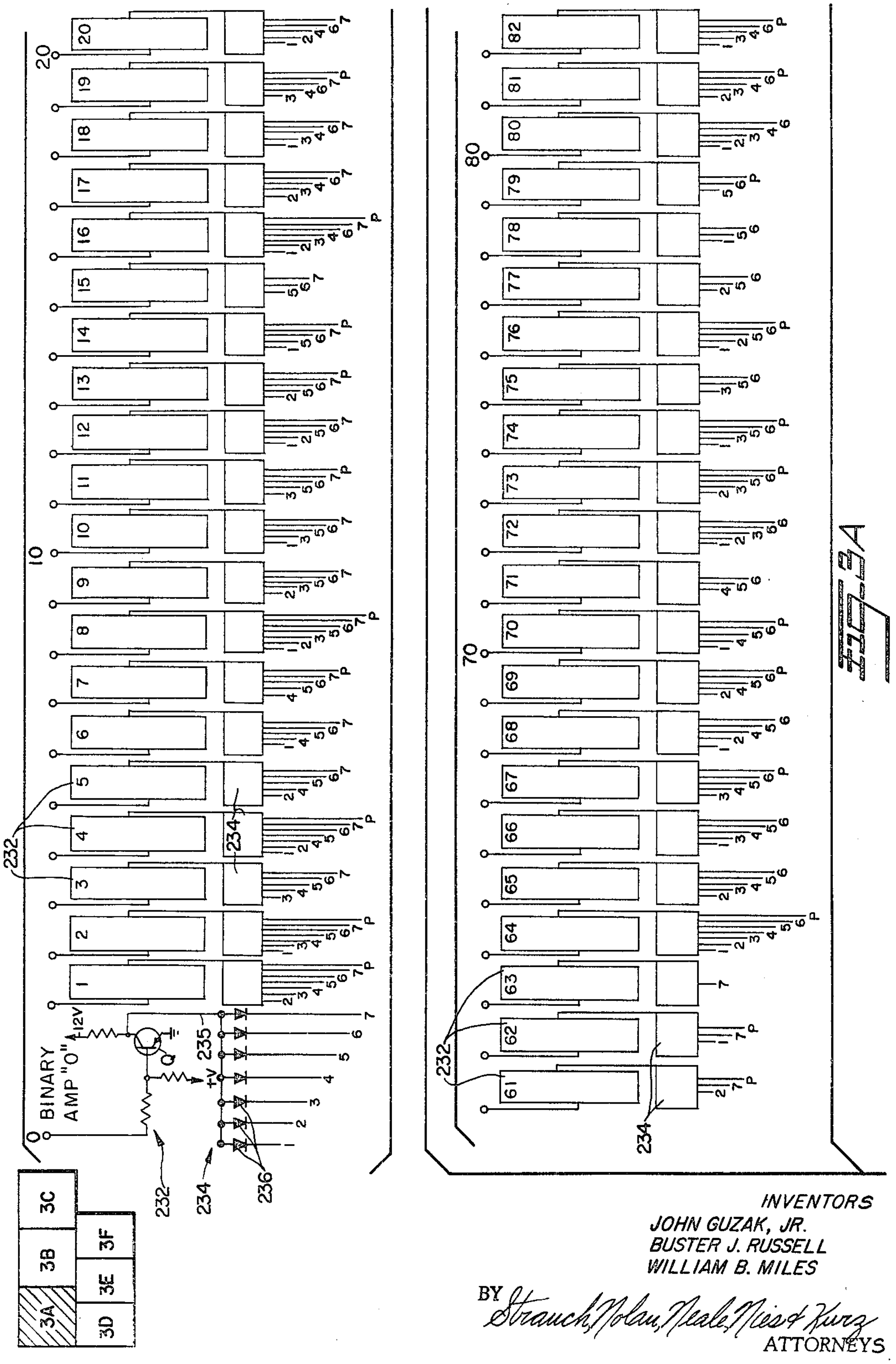
Figure 3C:
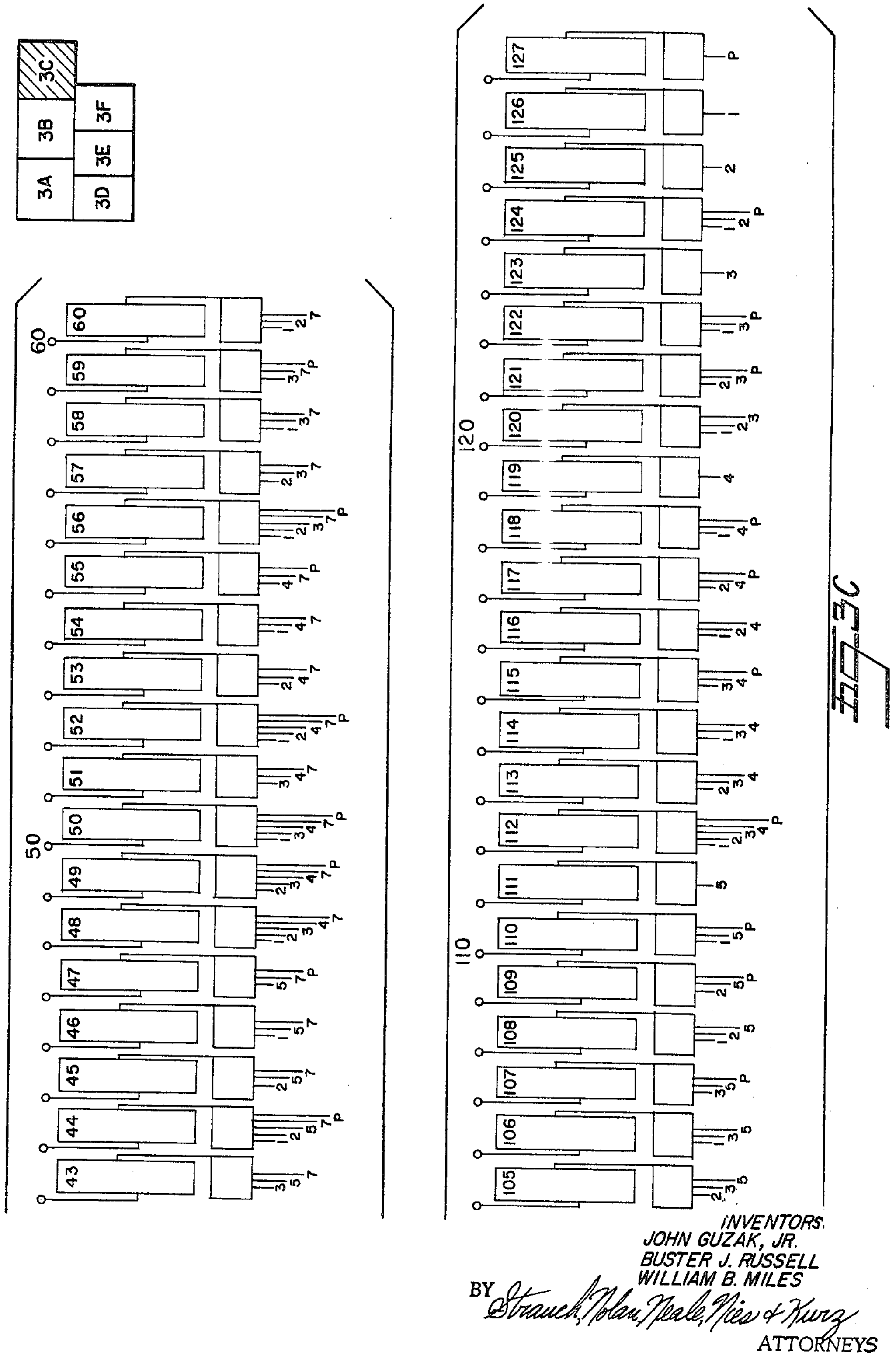
Figure 3F:
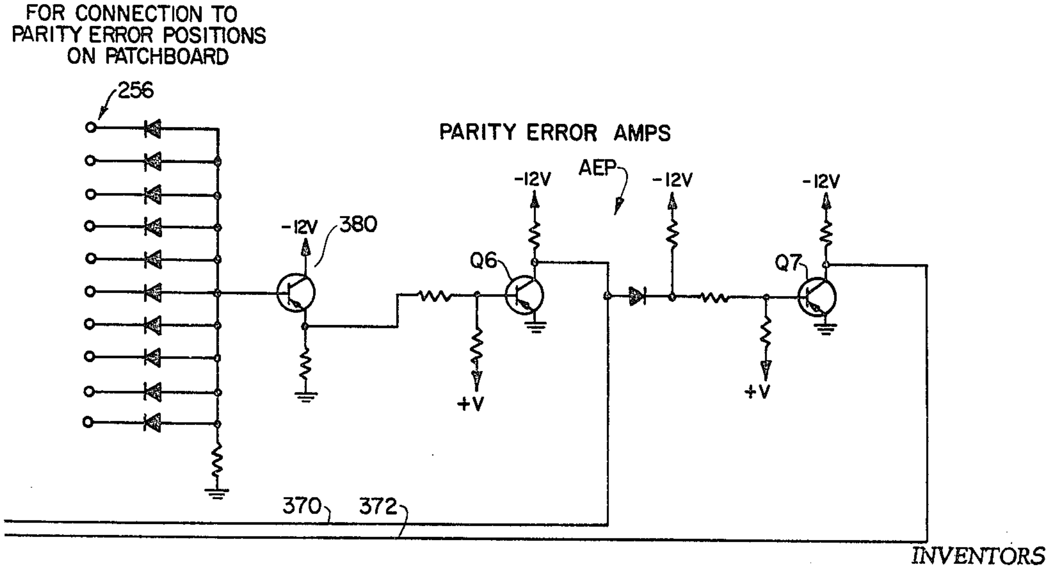
Figure 3F:
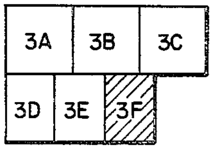

FIGURE 1 is a schematic diagram, using a combination of block and logic symbols, illustrating the complete code message generator in accord with the present invention;

FIGURE 2 consists of eight (8) sheets identified as FIGURES 2A through 2H. When each sheet of drawings is assembled as shown by the sheet position legend block included on each sheet, FIGURE 2 represents an electrical schematic diagram of a portion of the code message generator which includes the control and input circuitry, the sequencing binary counter and the converting matrix which converts the sequencing binary count into a sequential decimal count. FIGURES 2G and 2H include the individual decimal position output terminals and the input terminals to each of the code signal generating units, connections being made at these terminals through a patching arrangement as desired;

FIGURE 3 consists of six (6) sheets identified as FIGURES 3A through 3F. When assembled as shown by the position legend block included on each sheet, FIGURE 3 illustrates the remainder of the electrical schematic diagram and includes the binary code signal generating units which can be patched into the individual decimal count position output terminals, this group of figures constituting a continuation from the row of terminals illustrated at the bottom of FIGURES 2G and 2H, the eight unit parallel code output terminals being shown in FIGURE 3E; and FIGURE 4, which appears on the same sheet with FIGURE 3F, is a schematic diagram illustrating the code message generator power supply.

DESCRIPTION OF PREFERRED EMBODIMENT

General description

The test message generator has three general sections, control, counter and sequencing matrix, and encoding sections. It provides a source of binary coded data made available on eight parallel data lines, one of which is a parity bit data line. Individual code signal units enable generation of up to 128 different binary codes obtained by using a seven stage counter. The total sequence count can be expanded or reduced as desired by using more or less stages in the counter as will be apparent to those skilled in the art. A sequence of up to 128 codes can be programmed by means of a patch panel selectively interconnecting output position terminals from the counter and sequencing matrix to input terminals to the encoding section. Any binary code unit in the encoding section can be used more than once in a message sequence. An even and odd parity signal is generated with each binary code signal generation and its application to the output data line can be selected by the operator. Control circuitry and patching leads will enable parity errors to be deliberately programmed through the patch panel into desired ones of the sequence positions to permit testing of parity check circuits if they are present in the receiving equipment being tested. The control section enables any selected code in the sequence to be continuously repeated, and sequential generation of code signals to be selectively accomplished in three ways: (1) a single step mode provides manual sequencing and allows one code to be released each time a pushbutton is pressed; (2) by appropriate control switching, one code signal at a time in a sequence of code signals set up by patching can be sequentially transmitted by an appropriate voltage step on a control line such as a ready/busy line; or (3) a fixed time base mode (internal or external of the test message generator) allows the code signals in the message sequence to be transmitted at a predetermined continuous rate.

Before proceeding, it should be understood that the description for the most part will be directed to FIGURE 1. The combination of sheets which constitute FIGURES 2 and 3 and the power circuit in FIGURE 4 will be referred to as necessary, being included to provide a specific circuit disclosure for the preferred embodiment.

Turning to FIGURE 1, the complete test message generator 210 is illustrated by means of a combination of block and logic symbols. Apart from the various controls, the message generator 210 consists of a counter and matrix section 212, shown at the left hand side and upper center, and an encoding section 214 shown at the right hand side and lower center of FIGURE 1. The counter and matrix section 212 provides the successive signal pulse sequencing of each of the multiple output character positions for generating successive code signals of a desired message. In the illustrated example, which uses a seven stage counter, the number of successive sequence character positions is 128, permitting the use of a seven bit output code signal plus an eighth parity bit. The encoding section 214 includes code signal units 234 each of which can generate a different code signal in binary code form when it has been patch connected to a character sequence position and that character sequence position is conditioned for signal generation by the counter and matrix. A patch panel assembly 216 (either leads or printed circuit plug board) provides inter-connections between the two sections 212 and 214, thereby determining desired sequences of code signal generation to be controlled by the successively conditioned sequence positions of the counter and matrix section 212.

The illustrated seven stage counter 218 provides a count form 0–127, i.e., 128 discrete binary states. The two binary output leads "0" and "1" from each stage of counter 218 are connected to specific leads of a diode matrix 220, the schematic of which can be seen in FIGURES 2E through 2H. Diode matrix 220 converts the progressive binary state of counter 218 to a specific signal level on individual successive ones of 128 decimal positions in sequence, the decimal positions being shown as 128 output terminals 222 on the patchin gpanel assembly 216. Counter 218 can be controlled in various ways such as (1) a continuous single state, (2) single step one-shot control, (3) fixed stepping rate at selected time bases, or (4) a command mode of stepping operation, and can be reset manually or by an end-of-message signal, as will be discussed hereinafter.

The 128 character sequence position output terminals 222 can be patched by appropriate patching circuit leads 224 to any of the 128 code signal unit input terminals. All 128 of the character sequence position terminals can be connected through a common lead to a single one of the code unit terminals 226, if so desired, or any other number of the sequence terminals can be connected to any single one of the coded unit jacks 226. Signal feedback through such parallel connections is prevented by the blocking diodes 228 (see FIGURES 2G and 2H) located in each matrix output lead between the character sequence position terminals 222 and their association parity position terminals 230, the latter being more fully explained hereinafter.

Each of the code unit terminals 226 is individually connected to an associated code unit amplifier 232 which in response to a signal from the associated sequence character position terminal 222 is conditioned to apply a signal of the proper level through an associated code signal generating unit 234. Each of the code signal units 234 has its own individual coded output via from 1 to 7 data lines connected to the output of amplifier 232 through diode gates in the manner shown in the upper left hand corner of the FIGURE 3A. All output lines from all code signal units 234, which correspond to specific ones of the eight bits (the eighth bit is a parity bit) in the eight unit output code, are connected respectively to common data unit terminals C1 through C7 and the parity terminal CP illustrated at the upper right hand side of FIGURE 1. In other words all code leads marked 1 in FIGURES 3A, 3B and 3C connect to data bit terminal C1, all code leads marked 2 in FIGURES 3A, 3B and 3C connect to data bit terminal C2, etc.

Each of the seven data bit terminals C1–C7 is connected through an associated code bit amplifier AD1–AD7 thence through associated normal-invert gating circuit 240, from whence the circuit connections lead to an associated data bit output amplifier 242 which places an appropriate signal potential on an associated data output terminal D1–D7 on the eight unit data output terminal board assembly 244.

The eighth data bit terminal CP is also connected through an associated code bit amplifier ADP but the outputs of the amplifier connect to the odd-even parity switch S4 thence through a bank of OR gates 251, 252, 253, 254 to a parity bit output amplifier $242_P$ which places the appropriate parity bit signal potential on parity output terminal DP on the terminal board assembly 244.

The normal-invert gating circuit 240 for each of the code signal data bits 1–7 is controlled by the code bit condition switch S10, and depending on the switching position, will apply the generated code combination data bit output at a normal characteristic level or inverted to the opposite bit characteristic level. In the described embodiment the two levels are no-current and current derived at a negative voltage level. The code bit amplifiers AD1–AD7 and ADP which are identical, will be described in further detail hereinafter, with further description of the normal-invert gating.

The parity odd-even control switch S4, the parity "OR" gates 251, 252, 253, 254 and the parity error patch connections 256 will be described hereinafter, but it is here noted that "even" and "odd" parity signal levels are generated in the parity bit coding amplifier ADP along with each primary code signal and one or the other signal level from amplifier ADP can be selected for parity use by the operator through the parity switch S4. Parity errors when used are programmed through circuitry including the "OR" gates 251, 252, 253 and 254 and result in a reversal of the potential level characteristic of the parity bit from its level characteristic in accord with the specific code signal condition, whether its bits are normal or inverted as determined by switch S10, and whether odd or even parity is being used.

CONTROLS, COUNTER AND MATRIX

The control components shown at the left hand side of FIGURE 1 enable any selected code signal in the sequence to be continuously repeated and enable the sequence stepping of generated code signals to be accomplished in three ways: (1) the single step mode, allowing one code signal to be transmitted each time a manual pushbutton switch S7 is pressed; (2) one code at a time can also be released by an appropriate voltage level stepping pulse on a demand control line, i.e., ready/busy; and (3) fixed time base modes allow the sequence to be transmitted at any one of several available predetermined continuous rates.

Each stage of the seven stage counter 218 is a solid state bi-stable multi-vibrator with a circuit as illustrated in detail for counter stage A shown in FIGURE 2C. The bi-stable multi-vibrator stages A–G have diode clamping trigger circuits responsive to a negative pulse on its trigger input. Input line 262 to counter stage A provides the path for trigger pulses to sequentially change the binary count in counter 218. The "0" output from each of the first six stages is connected to the input of the succeeding stage thereby providing a chain counter through 128 binary states after which the counter starts counting again from 0. By controlling the timing and/or level of the pulses on input line 262, sequencing of the test message can be accomplished through all 128 counting states of counter 218. A common reset line 264 connects to the reset inputs of each stage of the counter 218. The counter can be reset by a reset one-shot 324, either manually or as a result of an end-of-message signal received at EOM terminal from associated equipment or from a patch connection to any of the character sequencing terminals 222. Input signals to line 262 are derived from and through the control components of the test generator as will now be described.

Generator controls

Figure 4:
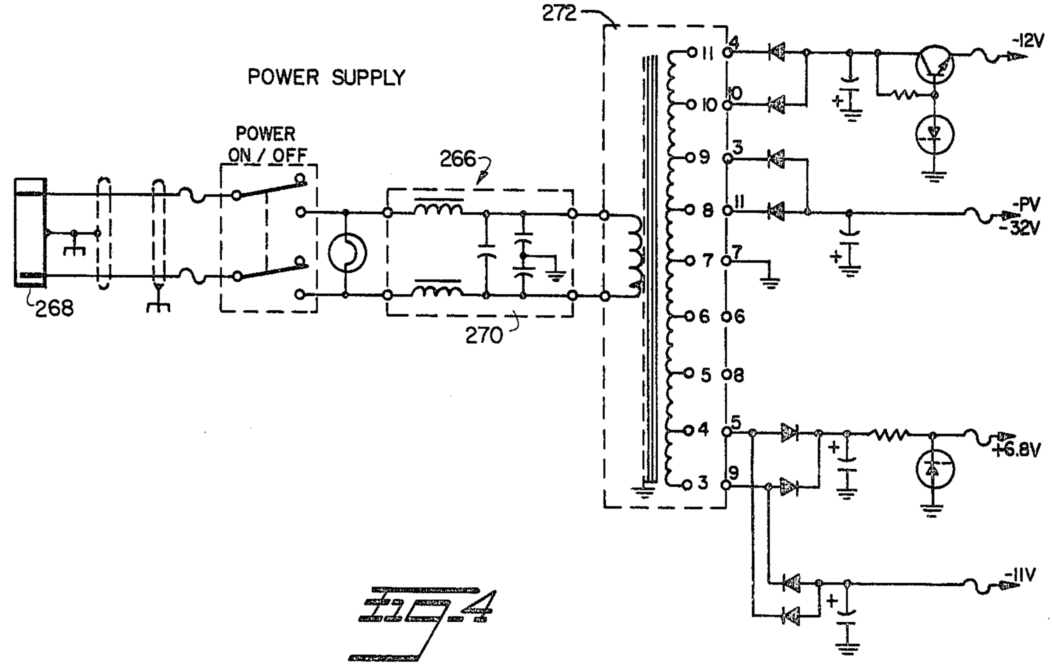

The test message generator is powered by DC, power being derived through a power supply assembly 266 shown in FIGURE 4. The power supply is essentially conventional but will be briefly described. It has a plug 268 enabling connection to a 115 v. AC, 60 cycle electrical power source, and includes the on-off power switch S1, a filter 270 and a transformer 272 with various taps leading into solid state rectifier circuitry to provide desired levels of DC voltage required for equipment operation.

With reference to FIGURE 1, control components, which include the aforementioned power switch S1 (see FIGURE 4), also include the manual-automatic switch S2, the repeat signal switch S3, the aforementioned parity "odd"-"even" switch S4, the strobe polarity switch S5, the ready/busy polarity switch S6, a manual stepping switch S7, the manual reset switch S8, the time base mode switch S9, and the previously referred to code bit output condition switch S10. In addition, there is a terminal board 274 providing terminal sockets for various external connections to associated equipment. For the disclosure, the terminal board 274 includes terminals 276, 277, 278 and 279 which, respectively, are for an external time base, ready/busy line, end-of-message signal line, and a strobe signal output line. Detail circuits for the control are shown in FIGURES 2A, 2B, 2D and 3D–3F.

The test message generator unit 210 includes self-contained components to provide three different time bases. Shown in the upper left hand corner of FIGURE 1 are two bi-stable multi-vibrator units 282 and 284 and a time base divider 286, detail circuitry being shown in FIGURE 2A.

The first multi-vibrator 282, designated Time Base 1, provides output pulses at 37.5 cycles per second and its output is connected to the number 1 terminal of mode switch S9. The second multi-vibrator 284, designated Time Base 2, provides output pulses at 20 cycles per second and has its output connected to the number 2 terminal of mode switch S9. A branch of the output from the 20 cycles per second Time Base 2 connects to the trigger input of a time base divider 286 designated Time Base 3, thereby dividing the 20 cycles per second output to a 10 cycle per second output. The output of the divider Time Base 3 connects to terminal 3 of mode switch S9. Provision is also made to accommodate and use externally generated time base pulses through the external plug board terminal 276 connected by a line 288 to contact 5 on mode switch S9. Contact 4 on mode switch S9 is connected via line 290 to the moving contact terminal of the ready/busy polarity switch S6, the fixed contacts of which are connected through an inverting amplifier circuit to the ready/busy terminal 277. A connection to the ready/busy line 290 is provided through lead 292 and amplifier circuits 294 to a ready lamp 296 for visual indication when the receiving equipment is ready for a code signal, used primarily when stepping is accomplished manually.

If it is desired that counter 218 be stepped continuously under automatic operation, switch S2 will be placed in its continuous operation position to close a circuit through lead 298 from the moving contact 299 of the mode switch S9. Depending upon the selective positioning of mode switch S9, the selected control signal pulses pass via switch S2 through a strobe delay circuit 300. The output of any time base or of the ready/busy signal through the strobe delay 300 provides signal pulses on control line 302 which connects, through an OR gate 304, to a signal inverter amplifier 306 (the two circuits 304 and 306 constitute a NOR gate) to the input line 262 for the seven stage counter 218. A branch from strobe delay output line 302 connects to the input of a strobe one shot circuit which is connected to a two stage strobe inverter amplifier 308, the output of which via the strobe phase switch S5, provides strobe pulses directly related to either the negative going transition or the positive going transition of the control pulse signals. From switch S5, a selected phase signal from either one or both stages of the amplifiers 308 are fed into a dual transistor amplifier 310 which provides positive going output pulses via lead 312 to the strobe out terminal 279 on external board 274.

If it is desired that counter 218 be stepped a single sequence position at a time under manual control, switch S2 will be placed in its stepping position to connect the strobe delay circuit 300, through lead 314, to the output of a signal step one-shot 316. The manual stepping one-shot 316 is triggered by closing the manual stepping switch S7 which completes a grounded circuit through gate 318. Each time the stepping switch S7 is closed a one-shot pulse of 1 millisecond duration is placed, via line 314 through control switch S2, strobe delay 300, line 302, OR gate 304 and inverter amplifier 306 to the counter input lead 262, thereby providing a single step advance in the binary state of counter 218.

If it is desired that one of the sequence positions of the 128 character position terminals of matrix 220 be conditioned to provide a continuous repetition of the output code signal controlled by the terminal, the repeat switch S3 is placed in its "repeat" position. This action places ground on a lead 320 connecting through OR gate 304 and inverter amplifier 306 to the counter input lead 262 and causes a steady negative level input to the first stage of the counter. Such action will step the counter to the next binary state and leave the matrix circuit energized at that sequence position thereby providing a constant level data output representing the selected code signal at the parallel data output terminals D1 through D7, and the parity terminal DP on terminal board 244. This arrangement leaves a steady level of data output and at the same time the strobe signal circuit is bypassed enabling the ready/busy circuit of associated equipment being tested to assume operating control. Therefore, the constantly applied code signal is repetitively received and recorded or otherwise utilized under control of that associated equipment's ready/busy circuitry.

Matrix

FIGURES 2C through 2H disclose the details of the matrix and its connections between the counter output leads "0" and "1" and the 128 character position terminals 222. The 128 character position terminals have circuits providing connections through independent resistances connected in parallel to a negative 12 volt source at the upper end of the matrix (FIGURES 2E and 2F). All of the matrix diodes as well as blocking diodes 228, are poled to provide a ground level on all character sequencing terminals 222, and parity error position terminals 230 from at least one of the seven counter stages to which those character position terminals are connected, excepting for the selected sequence position terminal lead which represents a decimal count corresponding to the binary count present in the counter 218. Whenever the counter 218 is at a specific binary count, the matrix output lead representing that count in decimals has no path through the counter stages to ground and therefore that lead goes to a negative 12 volt level, approximately. By means of the patching connections 224, that negative level signal can be applied to any one of the code signal unit terminals 226.

Encoder

Turning now to the upper left hand corner of FIGURE 3A, the details of one of the code unit amplifiers 232, that one which corresponds to binary code 0, is shown in detail. If the binary counter has reached the sequencing control signal position 222 which is connected to the first or binary code "0" encoding section terminal 226, a negative level potential will be placed on the input to the amplifier 232 of the associated code signal unit 234. A negative level on the input of any code signal unit amplifier 232 will forward bias the transistor Q of that amplifier whereupon its transistor conducts and places a ground level on the input and through the individual diodes 236 on the various code data bit output lines (in this specific instance all seven data lines) from that selected code signal generating unit 234. The signal levels on those code signal unit data bit lines are placed on the inputs C1–C7 of associated code bit amplifiers AD1–AD7 which place signals through the normal-invert gating 246 and amplifiers 242 (OD1–OD7) to the parallel code data output terminals panel 244. Any code bit amplifier AD1–AD7 which has its input placed at negative level by an output lead from a specific code signal unit 234 will at the same time it places a data signal level on the code data output terminal panel 244, place a ground level on an associated data lamp driver circuit LD1–LD7 causing the data lamps 322 to go "off." If the selected code signal generator does not have a code bit data lead to any of the code bit amplifiers AD1–AD7, the associated data lamp will be "on."

Code bit amplifiers, inverters, parity

Viewing FIGURES 3D, 3E and 3F together, several output circuits will now be described in further detail.

When a code signal generator unit 234 becomes activated or energized by a ground signal from an associated amplifier 232 it will place ground level on specified data terminals C1–C7 and CP depending upon the binary code the specific unit represents. Terminals C1–C7 and CP connect to inputs of respective code bit amplifiers AD1–AD7 and ADP all of which have circuitry as shown by AD1. If a ground level is placed on input terminal C1 the base of the first stage transistor Q1 is reverse biased and transistor Q1 turns "off," its collector goes negative placing a negative level on output lead 350 causing the base of second stage transistor Q2 to be forward biased and transistor Q2 is turned "on" so its collector goes to ground and its output lead 352 is placed at ground level. Alternatively if the code signal generator unit has no code signal unit bit lead connected to C1, the first stage transistor Q1 is "on" and the second stage transistor is "off" so the voltage levels on the two output leads 350 and 352 are reversed.

The normal-invert gating circuit 240 for each code signal data bit consists of two "OR" gates 246N and 246I each having one input connected to one of the two output leads 350 and 352 of the associated code bit amplifier AD1–AD7 and each of OR gates 246N and 246I having a second input 354 and 356 connected respectively to individual fixed terminals of the DPST code bit condition switch S10. The outputs of both OR gates 246N and 246I connect, through blocking diodes 358, to a common lead 360 which is connected to the input of the associated data output amplifiers OD1–OD7. When switch S10 is in "normal," a ground level is connected through input line 354 to OR gate 246I and its circuit output is thus placed at ground level which renders its output ineffective to control the associated data output amplifiers OD1–OD7. The "normal" condition of switch S10 opens the circuit through lead 356 to OR gate 246N so its output is controlled by the signal level condition occuring on the first stage output lead 350 from the associated coding amplifiers AD1–AD7. When a code signal generator unit 234 provides a ground signal level on the bit input to the respective coding amplifier, the first stage output line 350 goes negative making the output 360 or OR gate 246N go negative and applying forward bias to the base of the transistor Q3 in the associated data output amplifier. This causes the Q3 collector and its output to go to ground, reversely biasing both bases of a double transistor Q4 and Q5 output stage in the data output amplifier, with the result that the associated data output line circuit is placed in open condition. In the case of the binary "0" code signal generator unit 234, which places ground on all 7 data bit lines terminals C1–C7, the data output terminals D1–D7 thus will all be open or at a no-current condition.

The alternate position of code bit condition switch S10 reverses the condition at output terminals because OR gate 246I then controls the data output amplifier and a normal signal output from the second stage of each of the coding amplifiers AD1–AD7 is at ground level which turns transistor Q3 off and renders the transistors Q4 and Q5 conducting to complete a current carrying circuit to associated data output terminals D1–D7.

Turning now to the parity circuit, its coding amplifier ADP is identical to amplifier AD1, having a first stage output lead 362 and a second stage output lead 364. The first stage output lead 362 is connected to fixed terminals 1 and 4, and the second stage output lead 364 is connected to fixed terminals 2 and 3 of the DPDT parity "odd-even" switch S4. Leads 366 and 368 from the movable contacts of the parity switch S4 are connected to various inputs of a bank of the four parity OR gates 251–254. Other inputs of various ones of the four parity OR gates 251–254 are connected to the two leads 354 and 356 from the code bit condition switch S10, and other inputs of various ones of the four parity OR gates are connected to output leads 370 and 372 from the two outputs of a parity error amplifier AEP having circuitry somewhat similar to the coding amplifiers AD1–AD7 and ADP.

When no parity error patching connection has been made from the parity error terminal bank 256 to a desired parity error sequence position 230 on the patching panel assembly 216, the input to the parity error pre-amp 380 (see FIGURE 3F) is open and the input to the first stage transistor Q6 of parity error amplifier AEP is reverse biased, placing a negative level on output line 370 which forward biases the second stage transistor Q7, placing a ground level on its output line 32.

If a parity error is desired, a patching lead from any terminal of the parity error terminal bank 256 is connected to the desired parity error sequence position terminal 230. As before described, all the terminals 230 are at ground level except when the decimal count is at that sequence position and then the associated terminal 230 goes negative. A ground signal through any of the parity error terminals 256 to pre-amp 380 has no effect on the parity error amplifier AEP and therefore its two outputs remain with a negative level on lead 370 and ground level on lead 372. However, where a negative level through the error patching lead is applied to the input of pre-amp 380, its output goes negative and the output levels of the parity error amplifier are reversed, i.e., lead 370 goes to ground level and lead 372 goes to negative level.

Turning back now to FIGURE 3D it will be understood that if any of the three input leads to each of all four parity error OR gates 251, 252, 253 and 254 are at ground level, the common lead output line 382 from the bank of parity error OR gates holds at ground level and the parity data output amplifier 242P (or ODP) is rendered operative to complete a circuit to the parity terminal 8 on the data output terminal board 244. If there is no ground level input to any one of the parity error OR gates 251–254, a negative level output appears on the common output line 382 and the parity data amplifier output to the parity position terminal 8 is opened (no-current).

Assuming a condition of normal code bit condition (switch S10 normal), even parity (switch S4 in the even position) no parity error patching, and the first or binary "0" code signal generator unit 234 activated by a sequence position count, the following condition exists in the parity circuit. No parity bit output lead is present from the binary "0" code signal generator unit 234, so the parity coding amplifier output leads 362 and 364 are, respectively, at ground level and negative level. Thus the following signal levels are present on the inputs to the parity error OR gates 251–254.

| Lead | Actual | Relative | OR Gates | | | |
|---|---|---|---|---|---|---|
| | | | 251 | 252 | 253 | 254 |
| 354 | Grounded | (+) | xxx | (+) | xxx | (+) |
| 356 | Open | (0) | (0) | xxx | (0) | xxx |
| 366 | Grounded | (+) | xxx | xxx | (+) | (+) |
| 368 | Negative | (−) | (−) | (−) | xxx | xxx |
| 370 | Negative | (−) | (−) | xxx | xxx | (−) |
| 372 | Ground | (+) | xxx | (+) | (+) | xxx |

Although three of the OR gates, 252, 253 and 254 have at least one of their inputs at ground level, there is no ground level input to OR gate 251 so its output renders common lead 382 negative which causes the data output parity position terminal 8 on data output terminal board 244 to be placed at a no-current condition, as has been previously described. That is the correct data bit condition for a seven bit data output representing binary "0" with an eighth bit representing "even" parity.

Assuming one more example where all conditions are similar to the preceding example, excepting that a parity error patching lead has been inserted. Parity error patching will place parity error amplifier lead 370 at ground level and lead 372 at negative level, the reverse of the condition in the previous example. The following signal levels will now be present on the inputs to OR gates 251–254.

| Lead | Actual | Relative | OR Gates | | | |
|---|---|---|---|---|---|---|
| | | | 251 | 252 | 253 | 254 |
| 354 | Grounded | (+) | xxx | (+) | xxx | (+) |
| 356 | Open | (0) | (0) | xxx | (0) | xxx |
| 366 | Grounded | (+) | xxx | xxx | (+) | (+) |
| 368 | Negative | (−) | (−) | (−) | xxx | xxx |
| 370 | Ground | (+) | (+) | xxx | xxx | (+) |
| 372 | Negative | (−) | xxx | (−) | (−) | xxx |

It is seen that all four OR gates have at least one of their inputs at ground level, placing the output signal on common lead 382 at ground level which, as has been described, causes the data output parity position terminal 8 on the data output terminal board 244 to be placed at a current condition. That condition is the wrong level characteristic for the eighth parity bid added to a seven bit data output representing binary "0" when even parity is being used as parity check because it shows an odd parity count of one.

Similar examples for the other conditions, e.g., code bit condition inversion with either odd or even parity and with or without a parity error insertion, are not herein described but can be readily visualized by the reader.

The parity bit lamp driver LDP and associated lamp 322 operate in the same manner as described for the data bit drivers LD1–LD7 and their lamps 322.

The invention may be embodied in other specific forms without departing from the spirit or essential characteristics thereof.

What is claimed and desired to be secured by Letters Patent is:

1. A code message generator device for generating and transmitting a sequence of multiple parallel bit electrical code signals, in which the bits have one of two level characteristics, in a message consisting of plural code signals comprising: a plurality of different parallel bit code signal generating units each having an independent input and distinctive output means providing, upon energization of its input, a specific multiple bit parallel code signal output, counting means including a plurality of message position outputs for generating energizing signals in successive sequence on said plurality of position outputs, means providing connections from said position outputs to any code signal generating unit input, parallel bit signal output means, control means having control connections to said counting means for providing control of code signal bit characteristics and timing, and means connecting said parallel bit signal output means to said code signal generating unit outputs for providing application of parallel code signal bits in a generated message to said parallel bit signal output means, said means connecting said parallel bit signal output means to said code signal generating unit outputs including parity check generating means in said connections between said code signal generating units and said parallel bit output means, enabling inclusion of a parity bit in the multiple bit code signal appearing at said parallel bit output means for use by associated data communication equipment in checking parity of all code signals.

2. A code message generator deivce as defined in claim 1, including normal-invert means in said connecting means between said code signal generating units and said parallel bit output means selectively enabling inversion of all code bit level characteristics and the parity bit level characteristic generated by a code signal generating unit and appearing at said parallel bit output means.

3. A code message generator as defined in claim 2, wherein said normal-invert means includes a switch controlled dual OR gate circuit for and connected to each bit position of said output means and, in combination with said parity check generating means, includes a switch controlled parity OR gate circuit for and connected to the parity bit position of said parallel bit output means.

4. A code message generator device as defined in claim 3 wherein said parity check generating means comprises circuitry generating both bit level characteristics for a parity bit for every generated code signal and includes said special parity OR gate circuit and switching means for selectively applying either parity bit level characteristic to the parity bit position on said parallel bit output means to enable odd/even parity bit transmission with every generated code signal; and connections from said normal-invert means to said special parity OR gate circuit provides an inversion of the parity bit level characteristic in the effected code signal from that parity bit level characteristic selected by said switching means whether the normal parity level characteristic is odd or even.

5. A code message generator device as defined in claim 4, including parity error generating means including input means adapted to be selectively connected to receive an output signal from any of a plurality of said position outputs of said counting means and responsive to energization of such a selectively connected position output to generate a parity error in the code signal applied to said parallel bit output means by a code signal generating unit connected to and concurrently energized by said selectively connected position output.

6. A code message generator device as defined in claim 5, wherein connections from said parity error generating means to said special parity OR gate circuit provides a reversal of the parity bit level characteristic in the effected code signal from the desired parity bit characteristic for that code signal to create the parity error in that specific generated code signal, regardless of whether the desired parity bit characteristic is odd or even and regardless of whether all bits in the desired code signal output are at normal or inverted characteristic levels.

7. A code message generator device as defined in claim 1, including parity error generating means having input means adapted to be selectively connected to receive an energizing signal from any of a plurality of said position outputs of said counting means and responsive to energization of such a selectively connected position output to generate a parity error in the complete code signal applied to said output means by a code signal generating unit connected to and concurrently energized by said selectively connected position output.

8. A code message generator device as defined in claim 7, wherein said input means to said parity error generating includes a plurality of parallel input circuits enabling a connection to a plurality of any of said position outputs and each of said plurality of parallel input circuits includes means preventing signal feedback from any connected position output to any other connected position output.

9. A code message generator device as defined in claim 8, wherein each of the position outputs of said counting means includes a separate circuit connection in which a character position terminal and a parity error position connection terminal is included and means are included in each separate circuit connection between the character position terminal and said parity error position terminal to prevent a feedback signal from any character position terminal to said parity error position terminal and to the other portions of said counting means.

10. A code message generator device as defined in claim 7, wherein a parity gating circuitry is provided between said parity check generating means and the parity bit position on said output means, and connections from said parity error generating means to said parity gating circuitry provides a reversal of the parity bit level characteristic in the effected code signal from the desired parity bit level characteristic for that code signal to thereby create the parity error in that specific generated code signal.

11. A code message generator device as defined in claim 7, wherein said parity check generating means comprises circuitry generating both bit level characteristics for a parity bit for every generated code signal, includes parity gating circuitry and switching means for selectively applying either parity bit level characteristic to the parity bit position at said parallel bit output means to selectively enable parity bit transmission at a level for checking odd or even parity with every generated code signal; and connections from said parity error generating means to said parity gating circuitry provides a reversal of the parity bit level characteristic in the effected code signal from that parity bit level characteristic selected by said switching means whether the normal parity bit level characteristic is odd or even.

12. A code message generator device as defined in claim 1, wherein said parity check generating means comprises circuitry generating both bit level characteristics for a parity bit for every generated code signal, includes parity gating circuitry and switching means for selectively applying either parity bit level characteristic to the parity bit position at said code data output means to selectively enable parity bit transmission at a level for checking odd or even parity with every generated code signal.

13. A code message generator device as defined in claim 1, wherein a visual indicator circuit means connects to said parity check generating means and provides visual indication of a specific parity bit level characteristic in each generated code signal.

14. A code message generator device as defined in claim 11, wherein said control means provides input signals to said counting means and means in said counting means responsive to said control derived input signals provides application of a signal level potential on an individual one of said position outputs changing such application of a signal level potential in successive sequence from one position output to the next position output for each distinct input signal from said control means.

15. A code message generator device as defined in claim 14, wherein said counting means includes a multi-stage binary counter and a diode matrix decimal convertor which includes all of said position outputs, said binary counter having an input connected to receive input signals from said control means and bi-level outputs connected through said diode matrix to ground all matrix output positions excepting one position output corresponding to the decimal count equivalent of the immediate state of the binary count in said binary counter and, on said one position. applying a signal level potential different from ground level.

16. A code message generator device as defined in claim 15, wherein said control means includes reset circuitry connected to reset all stages of said binary counter to a zero binary count, and means to apply a signal to activate said reset circuitry.

17. A code message generator device as defined in claim 15, including circuitry enabling selective constant application of a signal level potential on any position output for repetitive transmission of a code signal generated by the code signal generating means having its input connected to that position output.

18. A code message generator device as defined in claim 16, wherein said control means comprises: component and circuit means providing plural sources of different signal pulses to control said counting means, and means for selectively utilizing and applying such pulses as stepping pulses to the input of said binary counter.

19. A code message generator device as defined in claim 18, wherein said component and circuit means selectively provide a plurality of internally and externally generated time based signal stepping pulses and also provide means for selectively connecting said binary counter input to a manual stepping signal control or to an external demand signal source.

20. A code message generator device as defined in claim 16, wherein said control means includes means for manually generating a stepping signal for stepping said binary counter, and means for selectively utilizing and applying such stepping signals to step said binary counter.

21. A code message generator device as defined in claim 16, wherein said means to reset said binary counter includes a reset one-shot having a triggering input connection, manual switching means connected to said triggering input to energize said reset one-shot, and means enabling a connection from any of said position outputs to said triggering input to energize said one-shot and reset said binary counter responsive to the counting means reaching the decimal count of that position output which applies a signal level potential thereon.

22. A code message generator device as defined in claim 15, wherein said control means includes circuitry enabling selective constant application of a signal level potential on any position output for repetitive transmission of a code signal generated by the code signal generating means having its input connected to that position output.

23. A code message generator device for generating and transmitting a sequence of multiple parallel bit electircal code signals, in which the bits have one of two level characteristics, in a message consisting of plural code signals comprising: a plurality of different parallel bit code signal generating units each having an independent input and distinctive output means providing, upon energization of its input, a specific multiple bit parallel code signal output, counting means including a plurality of message position outputs for generating energizing signals in successive sequence on said plurality of position outputs, means providing connections from said position outputs to any code signal generating unit input, parallel bit signal output means, control means having control connections to said counting means for providing control of code signal bit characteristics and timing, and means connecting said parallel bit signal output means to said code signal generating unit outputs for providing application of parallel code signal bits in a generated message to said parallel bit signal output means, said control means providing input signals to said counting means, means in said counting means responsive to said control derived input signals providing application of a unique signal level potential on an individual one of said position outputs and changes such application of unique signal level potential in successive sequence from one position output to the next position output for each distinct input signal, said counting means including a multi-stage binary counter and a diode matrix decimal converter which includes all of said position outputs, said binary counter having an input circuit connected to receive input signals from said control means and bi-level outputs connected through said diode matrix to provide said unique signal potential level on one of said position outputs corresponding to the decimal count equivalent of the immediate state of the binary count in said binary counter, said control means includes reset circuitry connected to reset all stages of said binary counter to their zero binary count, means for activating said reset circuitry, component and circuit means providing plural sources of different signal pulses to control said counting means, and means for selectively utilizing and applying such pulses as stepping pulses to the input of said binary counter.

24. A code message generator as defined in claim 23, wherein said component and circuit means selectively provide a plurality of internally and externally generated signal pulses of different time rate to step said binary counter and also provide means for selectively connecting a manual stepping signal control or an external demand signal source to said binary counter.

25. A code message generator device for generating and transmitting a sequence of multiple parallel bit electrical code signals, in which the bits have one of two level characteristics, in a message consisting of plural code signals comprising: a plurality of different parallel bit code signal generating units each having an independent input and distinctive output means providing, upon energization of its input, a specific multiple bit parallel code signal output, counting means including a plurality of message position outputs for generating energizing signals in successive sequence on said plurality of position outputs, means providing connections from said position outputs to any code signal generating unit input, parallel bit signal output means, control means having control connections to said counting means for providig control of code signal bit characteristics and timing, and means connecting said parallel bit signal output means to said code signal generating unit outputs for providing application of parallel code signal bits in a generated message to said parallel bit signal output means, said control means providing input signals to said counting means, means in said counting means responsive to said control derived input signals providing application of a unique signal level potential on an individual one of said position outputs and changing such application of unique signal level potential in successive sequence from one position output to the next position output for each distinct input signal, counting means including a multi-stage binary counter and a diode matrix decimal convertor which includes all of said position outputs, said binary counter having an input circuit connected to receive input signals from said control means and bi-level outputs connected through said diode matrix to provide said unique signal potential level on one of said position outputs corresponding to the decimal count equivalent of the immediate state of the binary ocunt in said binary counter, said control means including reset circuitry connected to reset all stages of said binary counter to their zero binary count, and means for activating said reset circuitry, said control means including means for manually generating a stepping signal for stepping said binary counter, and means for selectively utilizing and applying such stepping signals to step said binary counter.

26. A code message generator device for generating and transmitting a sequence of multiple parallel bit electrical code signals, in which the bits have one of two level characteristics, in a message consisting of plural code signals comprising: a plurality of different parallel bit code signal generating units each having an independent input and distinctive output means providing, upon energization of its input, a specific multiple bit parallel code signal output, counting means including a plurality of message position outputs for generating energizing signals in successive sequence on said plurality of position outputs, means providing connections from said position outputs to any code signal generating unit input, parallel bit signal output means, control means having control connections to said counting means for providing control of code signal bit characteristics and timing, and means connecting said parallel bit signal output means to said code signal generating unit outputs for providing application of parallel code signal bits in a generated message to said parallel bit signal output means, said control means providing input signals to said counting means, means in said counting means responsive to said control derived input signals providing application of a unique signal level potential on an individual one of said position outputs and changing such application of unique signal level potential in successive sequence from one position output to the next position output for each distinct input signal, said counting means including a multistage binary counter and a diode matrix decimal convertor which includes all of said position outputs, said binary counter having an input circuit connected to receive input signals from said control means and bi-level outputs connected through said diode matrix to provide said unique signal potential level on one of said position outputs corresponding to the decimal count equivalent of the immediate state of the binary count in said binary counter, said control means including circuitry enabling selective constant application of a signal level potential on any position output for repetitive generation of a code signal generated by the code signal generating unit having its input connected to that position output.

27. A code message generator device for generating and transmitting a sequence of multiple parallel bit electrical code signals, in which the bits have one of two level characteristics, in a message consisting of plural code signals comprising: a plurality of different parallel bit code signal generating units each having an independent input and distinctive output means providing, upon energization of its input, a specific multiple bit parallel code signal output, counting means including a plurality of message position outputs for generating energizing signals in successive sequence on said plurality of position outputs, means providing connections from said position outputs to any code signal generating unit input; parallel bit signal output means, control means having control connections to said counting means for providing control of code signal bit characteristics and timing, and means connecting said parallel bit signal output means to said code signal generating unit outputs for providing application of parallel code signal bits in a generated message to said parallel bit signal output means, said control means providing input signals to said counting means, means in said counting means responsive to said control derived input signals providing application of a unique signal level potential on an individual one of said position outputs and changing such application of unique signal level potential in successive sequence from one position output to the next position output for each distinct input signal, said counting means including a multi-stage binary counter and a diode matrix decimal convertor which includes all of said position outputs, said binary counter having an input circuit connected to receive input signals from said control means and bi-level outputs connected through said diode matrix to provide said unique signal potential level on one of said position outputs corresponding to the decimal count equivalent of the immediate state of the binary count in said binary counter, said control means including reset circuitry connected to reset all stages of said binary counter to their zero binary count, a reset one-shot having a triggering input connection, manual switching means connected to said triggering input for activating said reset one-shot, and means enabling a connection from any of said position outputs to said triggering input to activate said one-shot and reset said binary counter responsive to the counting means reaching the decimal count of that position output which applies a signal level potential thereon.

28. A code message generator device for generating and transmitting a sequence of multiple parallel bit electrical code signals, in which the bits have one of two level characteristics, in a message consisting of plural code signals comprising: a plurality of different parallel bit code signal generating units each having an independent input and distinctive output means providing, upon energization of its input, a specific multiple bit parallel code signal output, counting means including a plurality of message position outputs for generating energizing signals in successive sequence on said plurality of position outputs, means providing connections from said position outputs to any code signal generating unit input, parallel bit signal output means, control means having control connections to said counting means for providing control of code signal bit characteristics and timing, and means connecting said parallel bit signal output means to said code signal generating unit outputs for providing application of parallel code signal bits in a generated message to said parallel bit signal output means, said control means providing input signals to said counting means, and means in said counting means responsive to said control derived input signals providing application of a unique signal level potential on an individual one of said position outputs and changing such application of unique signal level potential in successive sequence from one position output to the next position output for each distinct input signal, said counting means including a multi-stage binary counter and a diode matrix decimal converter which includes all of said position outputs, said binary counter having an input circuit connected to receive input signals from said control means and bi-level outputs connected through said diode matrix to provide said unique signal potential level on one of said position outputs corresponding to the decimal count equivalent of the immediate state of the binary count in said binary counter, wherein said control means includes reset circuitry connected to reset all stages of said binary counter to their zero binary count, means to activate said reset circuitry, and at least three sources of predetermined clocking signals and a mode selection switch with provision for connection of any of said sources to the input of and to control stepping of said counting means.

29. A code message generator device for generating and transmitting a sequence of multiple parallel bit electrical code signals, in which the bits have one of two level characteristics, in a message consisting of plural code signals comprising: a plurality of different parallel bit code signal generating units each having an independent input and distinctive output means providing, upon energization of its input, a specific multiple bit parallel code signal output, counting means including a plurality of message position outputs for generating energizing signals in successive sequence on said plurality of position outputs, means providing connections from said position outputs to any code signal generating unit input; parallel bit signal output means, control means having control connections to said counting means for providing control of code signal bit characteristics and timing, and means connecting said parallel bit signal output means to said code signal generating unit outputs for providing application of parallel code signal bits in a generated message to said parallel bit signal output means, said control means providing input signals to said counting means, means in said counting means responsive to said control derived input signals providing application of a unique signal level potential on an individual one of said position outputs and changing such application of unique signal level potential in successive sequence from one position output to the next position output for each distinct input signal, said counting means including a multi-stage binary counter and a diode matrix decimal converter which includes all of said position outputs, said binary counter having an input circuit connected to receive input signals from said control means and bi-level outputs connected through said diode matrix to provide said unique signal potential level on one of said position outputs corresponding to the decimal count equivalent of the immediate state of the binary count in said binary counter, said control means including a repeat circuit and said input circuit to said binary counter includes an OR gate having one input connected to receive said input signals and another input being connected to said repeat circuit thereby enabling said counter to be clamped at any selected count position to provide a steady count condition to said matrix and thereby enabling a steady unique signal potential level on the selected decimal output position of said matrix which in turn results in a selected code signal being applied to the output means.

30. A code message generator device for generating and transmitting a sequence of multiple parallel bit electrical code signals, in which the bits have one of two level characteristics, in a message consisting of plural code signals comprising: a plurality of different parallel bit code signal generating units each having an independent input and distinctive output means providing, upon energization of its input, a specific multiple bit parallel code signal output, counting means including a plurality of message position outputs for generating energizing signals in successive sequence on said plurality of position outputs, means providing connections from said position outputs to any code signal generating unit input, parallel bit signal output means, control means having control connections to said counting means for providing control of code signal bit characteristics and timing, and means connecting said parallel bit signal output means to said code signal generating unit outputs for providing application of parallel code signal bits in a generated message to said parallel bit signal output means, the final bit of the generated code at the parallel bit output means is used for parity control, and circuit means to the parity bit position of said data output means including a parity amplifier and an odd-even parity bit control means.

31. A code message generator device as defined in claim 30, wherein said parity bit amplifier is at least a two-stage transistor amplifier the output from one stage being used to provide the parity bit level characteristic for odd count parity checks and the output from the other stage being used to provide the parity bit level characteristic for the even count parity check.

32. A code message generator device for generating and transmitting a sequence of multiple parallel bit electrical code signals, in which the bits have one of two level characteristics, in a message consisting of plural code signals comprising: a plurality of different parallel bit code signal generating units, each having an independent input and distinctive output means providing, upon energization of its input, a specific multiple bit parallel code signal output, counting means including a plurality of message position outputs for generating energizing signals in successive sequence on said plurality of position outputs, means providing connections from said position outputs to any code signal generating unit input, parallel bit signal output means, control means having control connections to said counting means for providing control of code signal bit characteristics and timing, and means connecting said parallel bit signal output means to said code signal generating unit outputs for providing application of parallel code signal bits in a generated message to said parallel bit signal output means, said control means includes normal-invert switching means in said connections between said code signal generating units and said output means selectively enabling inversion of all code bit level characteristics generated by a code signal generating unit and appearing at said output means.

33. A code message generator as defined in claim 30, wherein said normal-invert switching means includes a switch controlled dual OR gate circuit for and connected to each bit position of said parallel bit output means.

34. A code message generator device for generating and transmitting a sequence of multiple parallel bit electrical code signals, in which the bits have one of two level characteristics, in a message consisting of plural code signals comprising: a plurality of different parallel bit code signal generating units each having an independent input and distinctive output means providing, upon energization of its input, a specific multiple bit parallel code signal output, counting means including a plurality of message position outputs for generating energizing signals in successive sequence on said plurality of position outputs, means providing connections from said position outputs to any code signal generating unit input, parallel bit signal output means, control means having control connections to said counting means for providing control of code signal bit characteristics and timing, means connecting said parallel bit signal output means to said code signal generating unit outputs for providing application of parallel code signal bits in a generated message to said parallel bit signal output means, and visual indicator circuit means are provided and connect to the circuit between said code signal generating units and said parallel bit output means effecting visual indication of a specific bit level characteristic for each bit during generation of each generated code signal.

35. A code message generator device for generating and transmitting a sequence of multiple parallel bit electrical code signals, in which the bits have one of two level characteristics, in a message consisting of plural code signals comprising: a plurality of different parallel bit code signal generating units each having an independent input and distinctive output means providing, upon energization of its input, a specific multiple bit parallel code signal output, counting means including a plurality of message position outputs for generating energizing signals in successive sequence on said plurality of position outputs, means providing connections from said position outputs to any code signal generating unit input, parallel bit signal output means, control means having control connections to said counting means for providing control of code signal bit characteristics and timing, and means connecting said parallel bit signal output means to said code signal generating unit outputs for providing application of parallel code signal bits in a generated message to said parallel bit signal output means, circuitry provided between all of said code signal generating units and said parallel code signal output means includes a two stage transistor invertor amplifier corresponding to each bit position of said parallel code signal output means, each amplifier having an output from each stage, the two outputs of each said amplifier having different signal level potentials, and switch controlled circuitry means provided between each amplifier's dual outputs and as associated code bit position on said data output means selectively enabling generation of code signals with normal or inverted code bit level characteristics derived respectively from the outputs of one or the outputs of the other of the stages of all said amplifiers.

36. A code message generator device comprising: parallel bit signal outputs, a counter sequences, a plurality of preset binary code signal generating units connected to said parallel bit signal outputs, a connection patching arrangement connecting said counter sequencer and said code signal generating units for providing selective sequencing of any combination of said code signal generating units, and control means including circuitry operatively coacting with said signal generating units for providing selective generation of odd or even parity check bits within the generated code signal.

37. A code message signal generator as defined in claim 36, said circuitry including means for inverting each bit of each signal output from said code signal generating units.

38. A code message signal generator as defined in claim 36, said circuitry including means for inserting parity errors into the generated code signal.

39. A code message generator device comprising: parallel bit signal outputs, a counter sequencer, a plurality of preset binary code signal generating units connected to said parallel bit signal outputs, a connection patching arrangement connecting said counter sequencer and said code signal generating units providing selective sequencing of any combination of said code signal generating units, and control means including circuitry having means operatively coating with said signal generating units providing selective generation of odd or even parity check bits within the generated code signal, means for inverting code signal bits, means for inserting parity errors into the generated code signal, means for repeating any selected code signal, and selecting means providing selective use of several modes of stepping control to said counter sequencer, including manual, external demand or time base and a plurality of internal time bases.

40. A code message generator device for generating and transmitting a sequence of multiple parallel bit electrical code signals, in which the bits have one of two level characteristics, in a message consisting of plural code signals comprising: a plurality of different parallel bit code signal generating units each having an independent input and distinctive output means, each generating unit providing, upon energization of its input, a specific multiple parallel bit code signal output, counting means including a plurality of message position outputs for generating energizing signals in successive sequence on said plurality of position outputs, means selectively connecting said position outputs of said counting means to any code signal generating unit input, said selective connecting means connecting the input of at least one of said code signal generating units to more than one of said position outputs of said counting means by which at least one specific code signal is generated at different counts of said counting means, control means having control connections to said counting means for providing control of code signal bit characteristics and timing, parallel bit signal output means, and means connecting said parallel bit signal output means to said code signal generating unit outputs providing application of parallel signal bits in a generated message to said parallel bit signal output means.

41. A code message generator device as defined in claim 40, wherein said control means includes means for manually stepping said counting means to effect generation of one code signal each time said manual stepping means is operated.

42. A code message generator device as defined in claim 40, including means operatively coating with said signal generating units providing selective generation of odd or even parity check bits within the generated code signal.

43. A code message generator device as defined in claim 40, including means for inserting parity errors into the generated code signal.

44. A code message generator device as defined in claim 40, wherein said control means includes selecting means providing selective use of several modes of stepping control of said counting means, including manual, external demand, or time base and a plurality of internal time bases.

References Cited

UNITED STATES PATENTS

| | | | |
|---|---|---|---|
| 2,328,999 | 9/1943 | Rea | 178—69 |
| 2,609,433 | 9/1952 | Goff | 340—146.1 X |
| 2,870,254 | 1/1959 | Slayton et al. | 178—69 |
| 2,886,797 | 5/1959 | Gardberg | 340—166 |
| 2,997,540 | 8/1961 | Ertman et al. | 340—146.1 X |
| 3,206,743 | 9/1965 | Nielsen | 340—365 |
| 3,293,605 | 12/1966 | Moore | 340—146.1 X |
| 3,309,666 | 3/1967 | Frohman | 340—146.1 |
| 3,401,379 | 9/1968 | Prell et al. | 340—146.1 X |

EUGENE G. BOTZ, Primary Examiner

C. E. ATKINSON, Assistant Examiner

U.S. Cl. X.R.

178—69; 340—345, 365

PO-1050
(5/69)

UNITED STATES PATENT OFFICE
CERTIFICATE OF CORRECTION

Patent No. 3,491,337 Dated January 20, 1970

Inventor(s) John Guzak, Jr., Buster J. Russell, William B. Miles

It is certified that error appears in the above-identified patent and that said Letters Patent are hereby corrected as shown below:

Col. 1, line 53: "in tervals" should be --intervals--.
Col. 1, line 62: "of" should be --or--.
Col. 4, line 71: "form" should be --from--.
Col. 5, line 4: "patchin" should be --patching--, "gpanel" should be --panel--.
Col. 9, line 51: after "lines" insert --to--
Col. 11, line 62: "deivce" should be --device--.
Col. 14, Claim 22 should be deleted.
Col. 14, line 23: "electircal" should be --electrical--.
Col. 15, line 12: "providig" should be --providing--.
Col. 15, line 33: "ocunt" should be --count--.
Col. 18, line 50: "30" should be --32--.
Col. 19, line 39: "sequences" should be --sequencer--.
Col. 19, line 64: "coating" should be --coacting--.
Col. 20, line 37: "coating" should be --coacting--.

SIGNED AND SEALED
OCT 13 1970

(SEAL)
Attest:

Edward M. Fletcher, Jr.
Attesting Officer

WILLIAM E. SCHUYLER, JR.
Commissioner of Patents